(12) United States Patent
Tietje et al.

(10) Patent No.: US 12,275,540 B2
(45) Date of Patent: Apr. 15, 2025

(54) POSITIONING TOOL FOR APPARATUS MANUFACTURING

(71) Applicant: The Boeing Company, Chicago, IL (US)

(72) Inventors: Holger Tietje, Uplengen (DE); Mats Wachtendorf, Varel (DE); Hans-Joachim Neustadt, Hude (DE); Orest Silchuk, Covington, WA (US)

(73) Assignee: The Boeing Company, Arlington, VA (US)

( * ) Notice: Subject to any disclaimer, the term of this patent is extended or adjusted under 35 U.S.C. 154(b) by 210 days.

(21) Appl. No.: 17/658,172

(22) Filed: Apr. 6, 2022

(65) Prior Publication Data
US 2022/0332435 A1    Oct. 20, 2022

Related U.S. Application Data

(60) Provisional application No. 63/175,517, filed on Apr. 15, 2021.

(51) Int. Cl.
*B64F 5/10*    (2017.01)

(52) U.S. Cl.
CPC ..................... *B64F 5/10* (2017.01)

(58) Field of Classification Search
CPC ....................................................... B64F 5/10
See application file for complete search history.

(56) References Cited

U.S. PATENT DOCUMENTS 7,134,629 B2    11/2006  Johnson et al.

FOREIGN PATENT DOCUMENTS

| CA | 2895704 A1 | * | 1/2016 | ............. B21J 15/02 |
| EP | 3552773 A1 | * | 10/2019 | ............. B23Q 1/525 |

* cited by examiner

*Primary Examiner* — Nirvana Deonauth
(74) *Attorney, Agent, or Firm* — Walters & Wasylyna LLC

(57) ABSTRACT

A positioning tool (100) includes a lift mechanism (102), multiple curved rails (106), a carriage (110), and multiple clamps (114). The lift mechanism (102) has multiple stages (104) configured to move linearly between a retracted position (152) and an engaged position (154). The curved rails (106) are mounted on the stages (104). The carriage (110) is coupled to the curved rails (106) and is configured to be adjusted into an alignment with a panel (82). The clamps (114) are coupled to the carriage (110) and are configured to releasably couple a part (88) to the carriage (110) while the stages (104) are in the engaged position (154), hold the part (88) in the carriage (110) while the stages (104) are between the engaged position (154) and the retracted position (152), and releasably couple the part (88) to the carriage (110) while the stages (104) are in the retracted position (152).

20 Claims, 17 Drawing Sheets

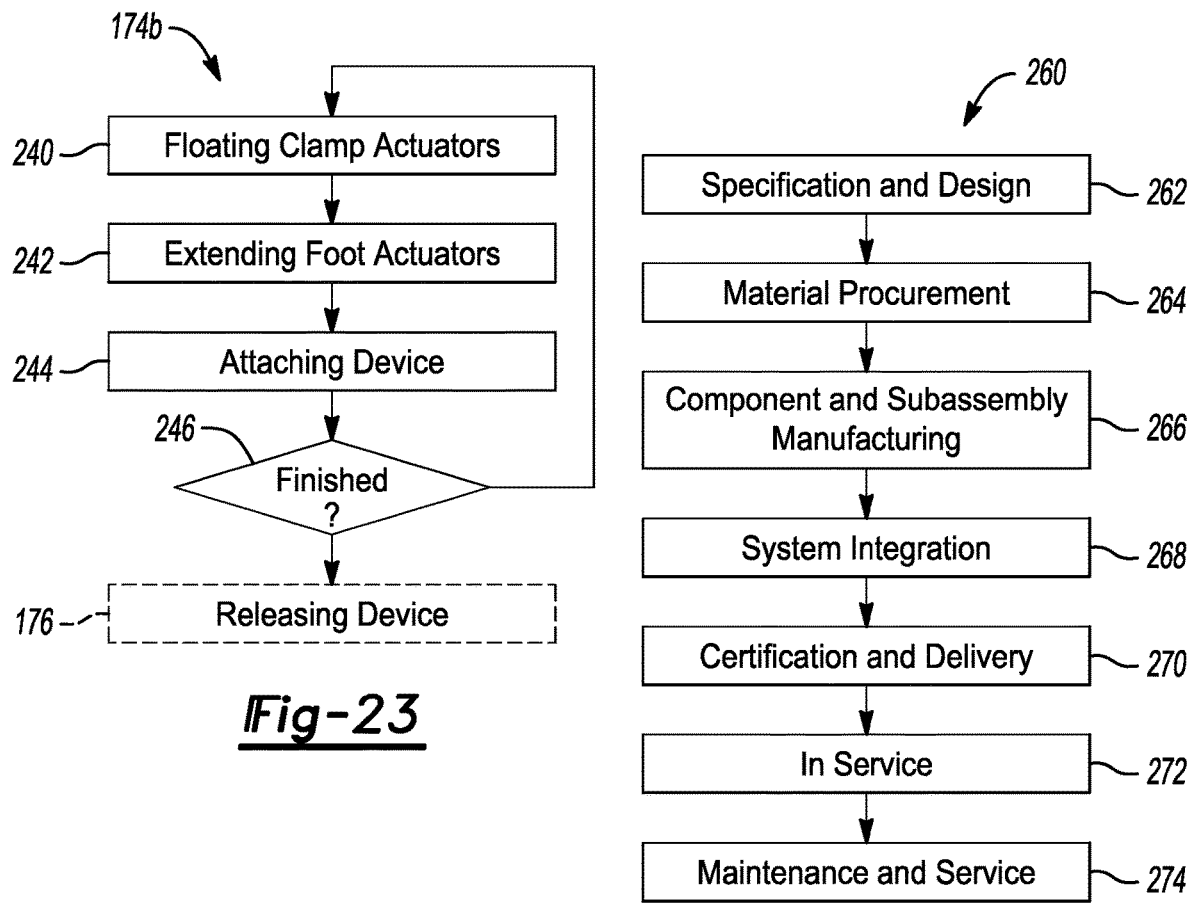
Fig-23
Fig-24
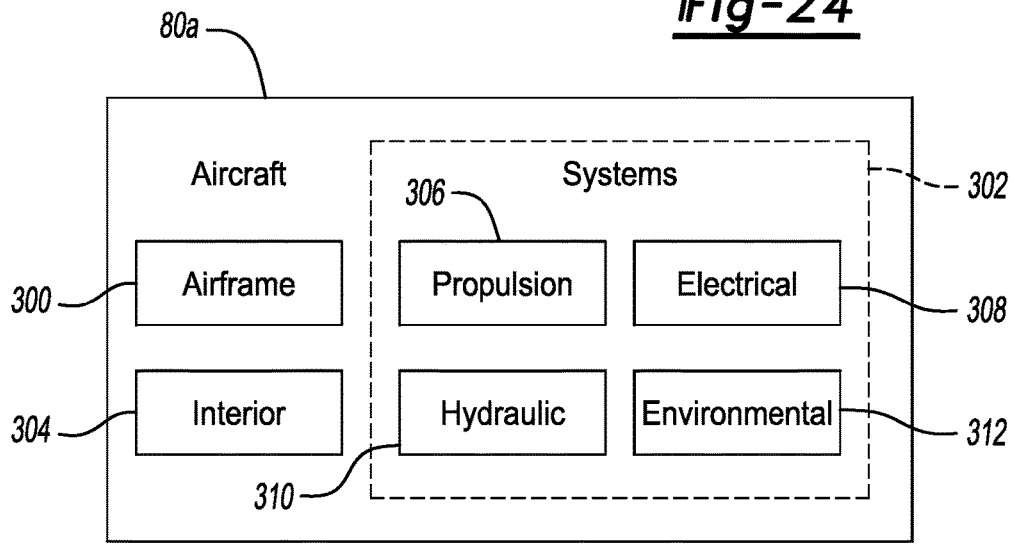
Fig-25

POSITIONING TOOL FOR APPARATUS MANUFACTURING

CROSS-REFERENCE TO RELATED APPLICATION

The present application claims the benefit of priority of U.S. Provisional Application 63/175,571 filed Apr. 15, 2021, which is hereby incorporated by reference in its entirety.

TECHNICAL FIELD

The disclosure relates generally to powered tools that lift and align objects, and in particular, to a positioning tool for apparatus manufacturing.

BACKGROUND

During construction of aircraft, a variety of objects are either manually lifted from a floor level into a fuselage of the aircraft, or manually lowered from the fuselage down to the floor. The lifting can be cumbersome when large objects are lifted into similar-sized spaces. The lifting should be performed in a controlled manner to avoid contacting inner walls of the fuselage. For objects being removed from the aircraft, such as heavy cutouts extracted from the fuselage, the cutouts and the surrounding panels should be held stationary while the fuselage is being cut.

Accordingly, those skilled in the art continue with research and development efforts in the field of raising objects into and lowering objects from the fuselages during construction of the aircraft. As such, it would be desirable to have a method and an apparatus that take into account at least some of the issues discussed above, as well as other possible issues.

SUMMARY

A positioning tool is provided herein. The positioning tool includes a lift mechanism, a plurality of curved rails, a carriage, and a plurality of clamps. The lift mechanism has a plurality of stages configured to move linearly along a first axis between a retracted position and an engaged position. The plurality of curved rails are mounted on the plurality of stages. The plurality of curved rails form a plurality of arc-segments around a second axis. The carriage is coupled to the plurality of curved rails and is configured to be adjusted into a refined alignment with the panel. The carriage is proximate to the panel while the plurality of stages are in the engaged position. The plurality of clamps are coupled to the carriage and configured to releasably couple a part to the carriage while the plurality of stages are in the engaged position, hold the part in the carriage while the plurality of stages are between the engaged position and the retracted position, and releasably couple the part to the carriage while the plurality of stages are in the retracted position.

In one or more embodiments, the positioning tool includes a plurality of alignment actuators disposed between the plurality of curved rails and the carriage. The plurality of alignment actuators are configured to slide along the plurality of curved rails and move the carriage in six degrees of freedom.

In one or more embodiments, the positioning tool includes a plurality of clamp actuators disposed between the carriage and the plurality of clamps. The plurality of clamp actuators are configured to adjust a spacing between the plurality of clamps and the carriage.

In one or more embodiments of the positioning tool, the part is an aircraft fuselage frame, the carriage has a semi-circle shape with a radius, and the plurality of clamp actuators are further configured to adjust the spacing in a radial direction between the plurality of clamps and the carriage to press the aircraft fuselage frame against the panel.

In one or more embodiments of the positioning tool, the part is a cutout from the panel, the plurality of clamps are a plurality of suction cups, and the plurality of suction cups are configured to hold the cutout in place while the cutout is being separated from the panel.

In one or more embodiments, the positioning tool includes a bin system configured to receive the cutout while the plurality of stages are in the retracted position and the carriage is rotated around a second axis to face the bin system.

In one or more embodiments of the positioning tool, the part is a door preassembly jig and a door surround, and the plurality of clamps are configured to releasably couple the door preassembly jig to the carriage.

In one or more embodiments of the positioning tool, the part is a window preassembly jig and a window surround, and the plurality of clamps are configured to releasably couple the window preassembly jig to the carriage.

In one or more embodiments, the positioning tool includes a plurality of alignment actuators disposed between the plurality of curved rails and the carriage, and a controller configured to provide manual control of the plurality of alignment actuators to adjust the refined alignment of the carriage to the panel.

In one or more embodiments of the positioning tool, the panel is a portion of an aircraft, the first axis is a vertical axis, the second axis is a horizontal axis, and the part is one of an aircraft fuselage frame, a door cutout from the panel, a window cutout from the panel, a door surround, or a window surround.

In one or more embodiments of the positioning tool, the panel is a portion of an apparatus, and the lift mechanism is disposed below the apparatus and in an initial alignment with the panel.

In one or more embodiments of the positioning tool, the second axis relocates with movement of the plurality of stages, and the second axis is perpendicular to the first axis.

In one or more embodiments of the positioning tool, the carriage is configured to move in six degrees of freedom relative to the plurality of curved rails to adjust the refined alignment.

A method for fabricating a portion of an aircraft using the positioning tool is provided herein.

A method for operating a positioning tool is provided herein. The method includes moving a plurality of curved rails linearly along a first axis between a retracted position and an engaged position. The method includes moving a carriage to adjust a refined alignment to a panel. The method further includes releasably coupling a part to the carriage with a plurality of clamps while the plurality of curved rails are in the engaged position, holding the part in the carriage while the plurality of curved rails are between the engaged position and the retracted position, and releasably coupling the part to the carriage while the plurality of curved rails is in the retracted position.

In one or more embodiments, the method includes sliding a plurality of alignment actuators along the plurality of curved rails. The alignment actuators are disposed between the plurality of curved rails and the carriage. The alignment actuators are configured to move the carriage in six degrees of freedom.

In one or more embodiments, the method includes adjusting a spacing between the plurality of clamps and the carriage.

In one or more embodiments of the method, the part is an aircraft fuselage frame, the carriage has a semicircle shape with a radius, and the spacing is adjusted in a radial direction between the plurality of clamps and the carriage to press the aircraft fuselage frame against the panel.

In one or more embodiments of the method, the part is a cutout from the panel, the plurality of clamps are a plurality of suction cups, and the plurality of suction cups are configured to hold the cutout in place while the cutout is being separated from the panel.

In one or more embodiments, the method includes releasing the cutout from the carriage to a bin system while the plurality of curved rails are in the retracted position and the carriage is rotated around the second axis to face the bin system.

In one or more embodiments of the method, the part is a door preassembly jig and a door surround, and the plurality of clamps are configured to releasably couple the door preassembly jig to the carriage.

In one or more embodiments, the method includes controlling the plurality of alignment actuators manually to adjust the refined alignment of the door surround with a door panel opening.

In one or more embodiments of the method, the plurality of curved rails are moved with a lift mechanism, the panel is a portion of an apparatus, and the lift mechanism is disposable below the apparatus and in an initial alignment with the panel.

In one or more embodiments of the method, the plurality of curved rails form a plurality of arc-segments around a second axis, the second axis relocates with movement of the plurality of curved rails, and the second axis is perpendicular to the first axis.

In one or more embodiments of the method, the carriage is moved in six degrees of freedom relative to the plurality of curved rails to adjust the refined alignment.

In one or more embodiments of the method, the carriage is coupled to the plurality of curved rails, and the carriage is proximate to the panel while the plurality of curved rails are in the engaged position.

A portion of an aircraft assembled according to the method is provided herein.

A method for installing a part in an aircraft is provided. The method includes coupling a part to a carriage while in a retracted position, and moving the carriage linearly along a first axis from the retracted position to an engaged position, moving the carriage to adjust a refined alignment of the part on the carriage to the panel, attaching the part to the aircraft at a panel of the aircraft, and releasing the part from the carriage while in the engaged position.

In one or more embodiments of the method, the part is an aircraft fuselage frame being attached to a stringer of the panel.

In one or more embodiments of the method, the part is a door surround being attached to the panel at a door panel opening.

In one or more embodiments of the method, the part is a window surround being attached to the panel at a window panel opening.

In one or more embodiments, the method includes adjusting a relative position between the aircraft and a lift mechanism to locate the lift mechanism below the aircraft and in an initial alignment with the panel. The lift mechanism is coupled to a plurality of curved rails, and the plurality of curved rails are coupled to the carriage.

In one or more embodiments of the method, the carriage is moved in six degrees of freedom to adjust the refined alignment.

A portion of an aircraft assembled according to the method is provided herein.

A method for installing an aircraft fuselage frame in an aircraft is provided. The method includes receiving the aircraft fuselage frame in a frame carriage in a retracted position. The aircraft fuselage frame has a relaxed radius of curvature that matches a panel of the aircraft. The method includes coupling the aircraft fuselage frame to the carriage, and placing a stress on the aircraft fuselage frame by bowing the aircraft fuselage frame. The aircraft fuselage frame has a retracted radius of curvature while under the stress. The retracted radius of curvature is less than the relaxed radius of curvature. The method further includes raising the aircraft fuselage frame linearly along a vertical axis from the retracted position to an engaged position, and releasing the stress on the aircraft fuselage frame. The aircraft fuselage frame has the relaxed radius of curvature and contacts the panel while the stress is released. The method includes attaching the aircraft fuselage frame to a stringer of the panel.

In one or more embodiments, the method includes releasing the aircraft fuselage frame from the carriage after the aircraft fuselage frame has been attached to the panel.

In one or more embodiments, the method includes moving the frame carriage to the retracted position.

In one or more embodiments, the frame carriage has a curved shape that spans an arc length. The method includes positioning the aircraft fuselage frame along the arc length of the frame carriage before the aircraft fuselage frame is coupled to the frame carriage.

In one or more embodiments, the method includes aligning the aircraft fuselage frame to one or more alignment marks on the frame carriage while positioning the aircraft fuselage frame along the arc length of the frame carriage.

In one or more embodiments of the method, the aircraft fuselage frame spans less than the arc length of the frame carriage.

In one or more embodiments, the method includes limiting the stress applied to the aircraft fuselage frame by engaging the aircraft fuselage frame with a plurality of hard stops at the retracted radius of curvature.

In one or more embodiments, the method includes moving the aircraft fuselage frame in six degrees of freedom to adjust a refined alignment of the aircraft fuselage frame to the panel.

In one or more embodiments, the method includes orienting the aircraft fuselage frame relative to a horizontal axis by sliding the plurality of alignment actuators along a plurality of curved rails.

In one or more embodiments, the method includes orienting the aircraft fuselage frame relative to another horizontal axis by adjusting a plurality of alignment actuators.

In one or more embodiments, the method includes adjusting a relative position between the aircraft and a lift mechanism to locate the lift mechanism below the aircraft and in an initial alignment with the panel. The lift mechanism has a plurality of stages, a carriage is coupled to the plurality of stages, a plurality of clamp actuators are mounted to the carriage, and a plurality of clamps are mounted to the plurality of clamp actuators opposite the carriage.

A portion of an aircraft assembled according to the method is provided herein.

A method for installing an aircraft fuselage frame in an aircraft is provided herein. The method includes receiving the aircraft fuselage frame in a frame carriage. The aircraft fuselage frame has two opposing ends. The method includes moving the two opposing ends toward each other to change a relaxed radius of curvature to a retracted radius of curvature, and moving the frame carriage vertically toward a panel of the aircraft. The aircraft fuselage frame is held at the retracted radius of curvature while being moved. The method includes aligning the aircraft fuselage frame until a center mouse hole of the aircraft fuselage frame is aligned with a center stringer of the panel, contacting a point of the aircraft fuselage frame to an inner mold line surface of the panel, moving the two opposing ends of the aircraft fuselage frame away from each other to bring a remainder of the aircraft fuselage frame into contact with the inner mold line surface of the panel, and attaching the aircraft fuselage frame to the panel.

In one or more embodiments, the method includes releasing the aircraft fuselage frame from the frame carriage, and moving the frame carriage vertically away from the aircraft fuselage frame.

A portion of an aircraft assembled according to the method is provided herein.

A method for manipulating an aircraft fuselage frame is provided herein. The method includes moving two opposing ends of the aircraft fuselage frame toward each other to bow the aircraft fuselage frame, clamping the aircraft fuselage frame as bowed, aligning the aircraft fuselage frame with a stringer of an aircraft, and releasing the aircraft fuselage frame from being bowed so that the aircraft fuselage frame contacts the stringer.

A portion of an aircraft assembled according to the method is provided herein.

A frame positioning tool is provided herein. The frame positioning tool includes a frame lift mechanism, a frame carriage, a plurality of fixation clamps, and a plurality of foot actuators. The frame lift mechanism has a plurality of frame stages configured to move linearly along a first axis between a retracted position and an engaged position. The frame carriage is coupled to the plurality of frame stages and configured to carry an aircraft fuselage frame. The frame carriage is proximate to a panel while the plurality of frame stages is in the engaged position. The plurality of fixation clamps is coupled to the frame carriage and configured to bow the aircraft fuselage frame while the plurality of frame stages is in the retracted position, hold the aircraft fuselage frame to the frame carriage while the plurality of frame stages is between the engaged position and the retracted position, and release the aircraft fuselage frame from the frame carriage while the plurality of frame stages is at the engaged position. The plurality of foot actuators is configured to press the aircraft fuselage frame to the panel while the plurality of frame stages is in the engaged position.

In one or more embodiments, the frame positioning tool includes a plurality of clamp actuators disposed between the frame carriage and the plurality of fixation clamps, and configured to adjust a spacing between the plurality of fixation clamps and the frame carriage.

In one or more embodiments of the frame positioning tool, the frame carriage has a semicircle shape with a radius, and the plurality of foot actuators is further configured to move in a radial direction to press the aircraft fuselage frame against the panel.

In one or more embodiments, the frame positioning tool includes a plurality of foot pads disposed on the foot actuators and configured to engage a plurality of feet of the aircraft fuselage frame.

In one or more embodiments, the frame positioning tool includes an XY float table disposed between the plurality of frame stages and the frame carriage, and configured to move along a second axis and a third axis. The first axis is perpendicular to the second axis and the third axis. The second axis is perpendicular to the third axis.

In one or more embodiments, the frame positioning tool includes a controller configured to provide manual control of the plurality of frame stages and the XY float table to adjust an alignment of the aircraft fuselage frame to a stringer of the panel.

In one or more embodiments of the frame positioning tool, the panel is a portion of an aircraft, the first axis is vertical, the second axis is horizontal, the third axis is horizontal.

In one or more embodiments, the frame positioning tool includes a plurality of retainer clamps disposed along the frame carriage and configured to hold the aircraft fuselage frame to the frame carriage while the plurality of frame stages is between the engaged position and the retracted position, and release the aircraft fuselage frame from the frame carriage while the plurality of frame stages is at the engaged position.

In one or more embodiments of the frame positioning tool, the plurality of fixation clamps is in a floating mode that enables to aircraft fuselage frame to relax from being bowed to a relaxed radius of curvature that conforms to the panel.

A method for fabricating a portion of an aircraft using a frame positioning tool is provided herein.

The above features and advantages, and other features and advantages of the present disclosure are readily apparent from the following detailed description of the best modes for carrying out the disclosure when taken in connection with the accompanying drawings.

BRIEF DESCRIPTION OF THE DRAWINGS

FIG. 24 is a flow diagram of a method of aircraft production and service methodology in accordance with one or more exemplary embodiments.

FIG. 25 is a schematic diagram of components of an aircraft in accordance with one or more exemplary embodiments.

DETAILED DESCRIPTION

Figure 1:
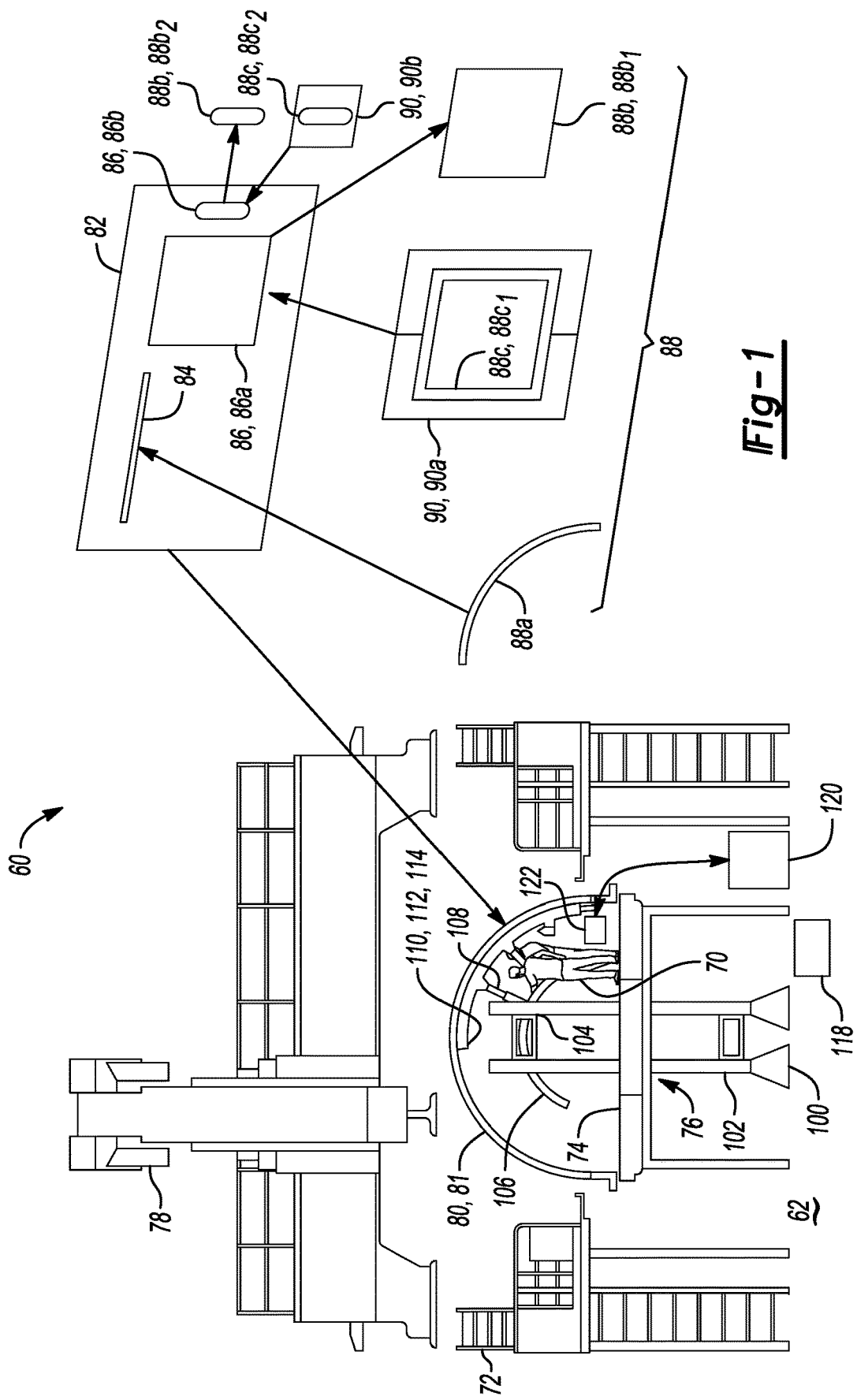
FIG. 1 is a schematic diagram of a manufacturing system in accordance with an exemplary embodiment.

This disclosure is susceptible of embodiments in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

Embodiments of the present disclosure include positioning tools 100, methods of operating 160 the positioning tools 100 and/or methods 160a of installing and removing parts 88 from an apparatus 80 using the positioning tools 100. The positioning tools 100 may be used in a manufacturing system 60 to assemble different types of apparatuses 80. The apparatuses 80 may include, but are not limited to, aircraft 80a, boats, ground vehicles, space vehicles, containers, machines, autoclaves, buildings, and/or products used as part(s) of the apparatus 80. The positioning tools 100 provide for lifting of heavy and/or large parts 88, such as aircraft fuselage frames 88a, window surrounds 88c2, and door surrounds 88c1 brought in under the apparatus 80 (e.g., a half of a fuselage 81 or a half barrel section of the apparatus 80) from an outside supply line. The positioning tools 100 also provide for lowering heavy and/or large parts 88, such as cutouts 88b (e.g., door cutouts 88b1 and window cutouts 88b2) from panels 82 of the apparatus 80, from inside the apparatus 80 to outside and below the apparatus 80. The cutouts 88b are from trimming out portions of the panel 82 that are removed to facilitate window installations and/or door installations. The cutouts 88b are the trimmed out manufacturing excess that is part of the structure when the panel 82 is fabricated and cured. Various embodiments of the positioning tools 100 may include, but are not limited to, a frame positioning tool 100a, a cutout positioning tool 100b, and a surround positioning tool 100c for doors and windows.

The frame positioning tool 100a embodiments are operational to lift one or more aircraft fuselage frames 88a from a lower retracted position 152 up into an engaged position 154 for assembly on a structure of a fuselage 81. The frame positioning tools 100a are also operational to manipulate the aircraft fuselage frames 88a prior to mating with the fuselage 81. The frame positioning tools 100a are configured to pull two opposing ends 92 of the aircraft fuselage frames 88a inward (e.g., bow the aircraft fuselage frame 88a under tension) so that the two opposing ends 92 clear the fuselage 81 as the aircraft fuselage frames 88a are being inserted (raising step 166, see FIG. 8) into the fuselage 81. Once an upper part (e.g., point 93) of an arch on an aircraft fuselage frame 88a is mated to the fuselage 81, the two opposing ends 92 can be released to mate with the fuselage 81. The aircraft fuselage frames 88a have a complementary shape to at least a portion of the interior of the panel 82/half barrel section of the fuselage 81. During or after the aircraft fuselage frame 88a is unbowed/tension released, the aircraft fuselage frame 88a can be fastened in place to finish the assembly. This technique allows the aircraft fuselage frames 88a to be inserted from underneath the fuselage 81 using automated equipment without impacting the fuselage 81.

The cutout positioning tool 100b embodiments are automated to move into place and hold surfaces of the fuselage 81 where pieces will be cut and removed. The cutout positioning tools 100b vacuum-grip surfaces that will be cut out and removed from the fuselage 81 to form openings (e.g., door panel openings 86a and window panel openings 86b). The cutout positioning tools 100b retract after the cutouts 88b (e.g., door cutouts 88b1 and window cutouts 88b2) have been freed, and subsequently rotate and drop the cutouts in bin systems 118 to take away as scrap material. This technique provides a way of holding and discarding the scrap material (e.g., door cutouts 88b1 and window cutouts 88b2) of the fuselage 81 from the window panel openings 86b and the door panel openings 86a.

The surround positioning tool 100c embodiments can automatically move door surrounds 88c1 and window surrounds 88c2 from the retracted position 152 to lift and position the door surrounds 88c1 and the window surrounds 88c2 in place for mounting to the fuselage 81. The surround positioning tools 100c may grip preassembly jigs 90 (door preassembly jigs 90a and window preassembly jigs 90b) and surrounds 88c (e.g., the door surrounds 88c1 and the window surrounds 88c2) while in the retracted position 152. The preassembly jigs 90a and 90b and the surrounds 88c1 and 88c2 are subsequently raised to the engaged position 154, rotated to align with a door opening or a window opening (e.g., the door cutout 88b1 or the window cutout 88b2) in the fuselage 81 Once aligned, the surround positioning tools 100c move the door surrounds 88c1 and the window surrounds 88c2 into the openings. After the door surrounds 88c1 or the window surrounds 88c2 are attached to the fuselage 81, the surround positioning tools 100c release the preassembly jigs 90a or 90b and return to the retracted position 152. This technique provides a way of automatically loading the door surrounds 88c1 and the window surrounds 88c2 into position with the fuselage 81 for fastening. While the window surround 88c2 or the door surround 88c1 is placed upon the window or door surround lands on the inner surface of the half barrel section (or panel 82). The surround positioning tool 100c holds the door surround 88c1 or the window surround 88c2 in place while being tacked into place and/or fastened into place.

Referring to FIG. 1, a schematic diagram of an example implementation of a manufacturing system 60 is shown in accordance with an exemplary embodiment. The manufacturing system 60 generally includes a scaffold (or staging) 72 having a floor 74 with an opening 76. The opening 76 in the floor 74 generally ensures full height flexibility of the working platform wherein the opening 76 in the floor 74 allows the scaffold 72 to be designed to an individual height without restrictions due to the positioning tool 100. A milling head 78 is mounted on or near the scaffold 72. One or more workers 70 may move about on the floor 74 of the scaffold 72 and/or on the ground 62 below the scaffold 72.

The apparatus 80 is located within the manufacturing system 60 above the scaffold 72. The apparatus 80 may be an aircraft, a boat, a ground vehicle, a space vehicle, a container, a machine, an autoclave, a building, or a portion of the apparatus 80 being assembled. For example, the apparatus 80 may be a piece of an airframe and/or a wing. As illustrated, a portion of the apparatus (e.g., an upper half of a fuselage 81) may be located in the manufacturing system 60. The apparatus 80 generally includes one or more panels 82. For example, the half barrel section of the fuselage 81 may be one large panel 82. Each panel 82 may be associated with one or more stringers 84 and/or one or more panel openings 86 where the window panel openings 86b and/or the door panel openings 86a are located. The stringers 84 are generally oriented longitudinally along the fuselage 81. The aircraft fuselage frames 88a are oriented perpendicular to the stringers 84.

One or more parts 88 are installed and/or removed from the apparatus 80 at the panels 82 in the manufacturing system 60. In some embodiments, the parts 88 may be aircraft fuselage frames 88a that are being attached to the stringers 84. In other embodiments, the parts 88 may be the cutouts 88b that have been cut away from the panels 82 to leave behind the panel openings 86 (e.g., door panel openings 86a and/or window panel openings 86b). In various embodiments, the parts 88 may be door surrounds 88c1 coupled to door preassembly jigs 90a. The door surrounds 88c1 are installed in the door panel openings 86a and the door preassembly jigs 90a are subsequently removed. In other embodiments, the parts 88 may be window surrounds 88c2 coupled to window preassembly jigs 90b. The window surrounds 88c2 are installed in the window panel openings 86b and the window preassembly jigs 90b are subsequently removed.

A positioning tool 100 is located on the ground 62 and extends up toward the apparatus 80 through the opening 76 in the floor 74 of the scaffold 72. A bin system 118 is generally located on the ground 62 near the positioning tool 100 in embodiments where the positioning tool 100 is employed to lower the door cutouts 88b1 and/or the window cutouts 88b2 from the apparatus 80. The bin system 118 is configured to receive the door cutouts 88b1 and/or the window cutouts 88b2 while the positioning tool 100 is in a retracted position 152 (see FIG. 7) and rotated (e.g., transverse 140d, FIG. 10) so that the door cutout 88b1 and/or the window cutouts 88b2 face the bin system 118.

A controller 120 of the positioning tool 100 provides electronic control of alignment actuators 108, clamp actuators 112 and clamps 114 in the positioning tool 100 to raise/lower, rotate, align, and releasably couple (e.g., alternately release or couple) the various parts 88 to the positioning tool 100. The controller 120 is configured to perform automatic control and manual control of the positioning tool 100.

The positioning tool 100 includes the hand controls 122 that may be in signal communication (e.g., wired and/or wireless) with the controller 120. The hand controls 122 are generally located on the scaffold 72 and/or the ground 62 so that the workers 70 can enter manual commands to maneuver the positioning tool 100.

Each embodiment of the positioning tools 100 generally include a lift mechanism 102, multiple stages 104, multiple curved rails 106, multiple alignment actuators 108, a carriage 110, multiple clamps 114, the controller 120, and the hand controls 122. In various embodiments, some positioning tools 100 may include multiple clamp actuators 112 and multiple hard stops 116 (see 116a in FIG.2 and 116b in FIG. 10). Some embodiments of the positioning tools 100 include alignment marks 124 (see FIG. 2) on the carriages 110. Variations of the components in different embodiments of the positioning tool 100 may be designated by an "a", "b" or "c" suffix after their corresponding reference numbers to distinguish particular configurations.

Figure 2:
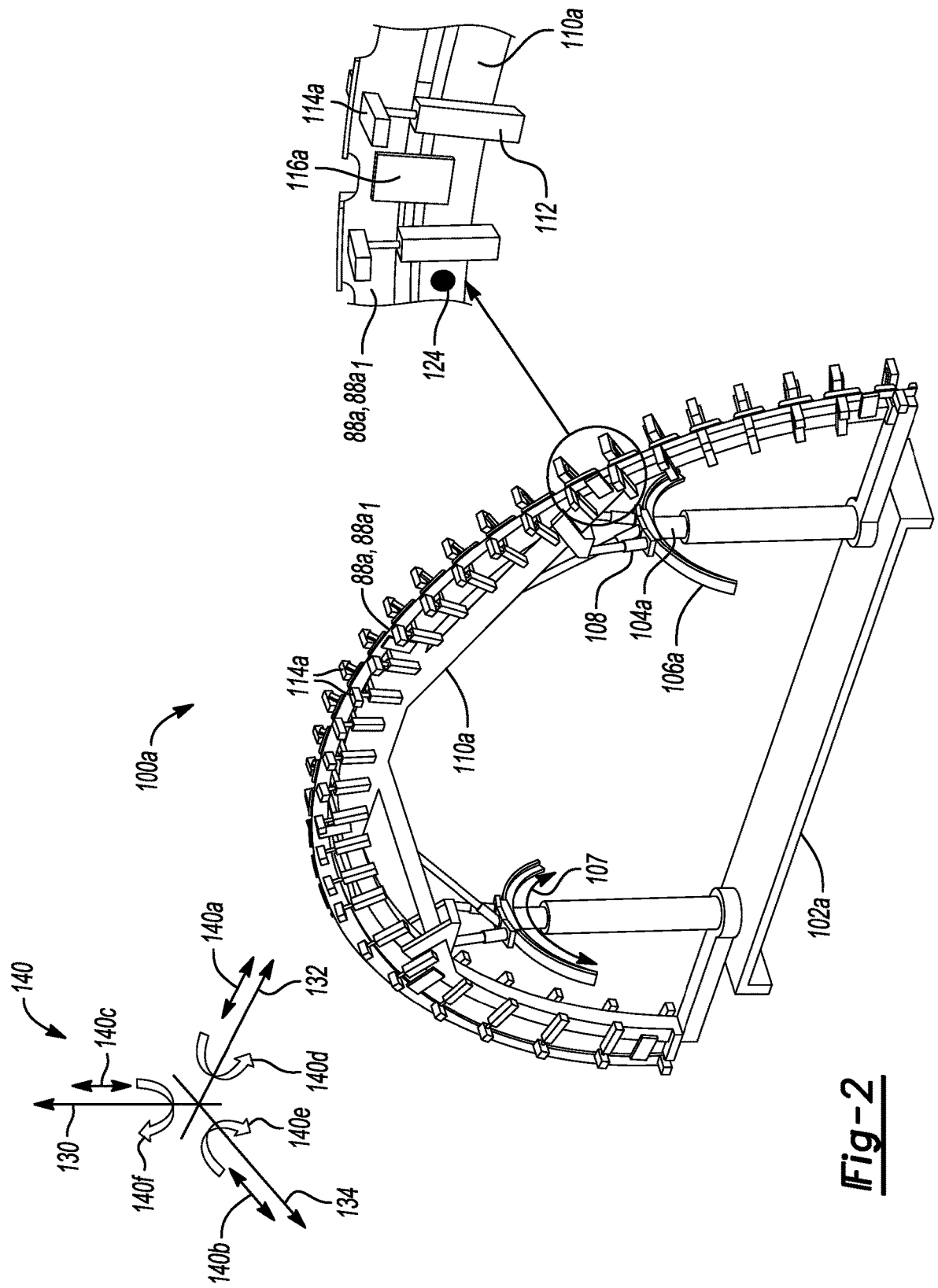
FIG. 2 is a schematic diagram of a frame positioning tool in accordance with one or more exemplary embodiments.

Referring to FIG. 2, a schematic diagram of an example implementation of a frame positioning tool 100a is shown in accordance with one or more exemplary embodiments. The frame positioning tool 100a may be a variation of the positioning tool 100. The frame positioning tool 100a includes a frame lift mechanism 102a, multiple frame stages 104a, multiple intermediate curved rails 106a, multiple alignment actuators 108, a frame carriage 110a, multiple clamp actuator 112, multiple fixation clamps 114a, multiple frame hard stops 116a, and one or more alignment marks 124. The frame positioning tool 100a is configured to aid in the installation of the aircraft fuselage frames 88a (e.g., a 180-degree frame 88a1 is illustrated) While a 180-degree frame 88a1 is illustrated (also see FIG. 3), shorter aircraft fuselage frames 88a may be installed using the frame positioning tool 100a, such as a 120-degree frame 88a2 (see FIG. 4) and a 90-degree frame 88a3 (see FIG. 5). Other sizes of the aircraft fuselage frames 88a (e.g., 45-degree frames) may be implemented to meet the design criteria of a particular application The aircraft fuselage frames 88a may be manipulated by the frame positioning tool 100a in a Cartesian coordinate system that defines a first (e.g., z or vertical) axis 130, a second (e.g., x or horizontal) axis 132, and a third (e.g., y or another horizontal) axis 134. The axes 130, 132, and 134 are perpendicular to each other. The frame positioning tool 100a is configured to orient the aircraft fuselage frames 88a in six degrees of freedom 140. The six degrees include three motions: a left/right (or sway) motion 140a along the second axis 132; a forward/backward (or surge) motion 140b along the third axis 134; and an up/down (or heave) motion 140c along the first axis 130. The six degrees include three rotations: a transverse rotation (or pitch) 140d about the second axis 132, a longitudinal rotation (or roll) 140e about the third axis 134; and a normal rotation (or yaw) 140f about the first axis 130.

The left/right motion 140a is achieved by extending/shortening the alignment actuators 108 oriented along the x-z (132-130) plane. The forward/backward motion 140b is achieved by moving the alignment actuators 108 along the intermediate curved rails 106a. While the frame carriage 110a is positioned along the intermediate curved rails 106a other than straight over the frame stages 104a, additional forward/backward motion 140b is achieved by extending/shortening the alignment actuators 108. The up/down motion 140c is achieved by moving the frame stages 104a. Additional up/down motion 140c is achieved by extending/shortening the alignment actuators 108. The transverse rotation 140d, the longitudinal rotation 140e, and the normal rotation 140f are achieved by extending/shortening the alignment actuators 108 as is done in a regular motion simulation platform.

The frame lift mechanism 102a is implemented as a multi-cylinder z-stroke lift mechanism. The frame lift mechanism 102a resides on the ground 62 in the manufacturing system 60 below the apparatus 80. The frame lift mechanism 102a is operational to raise and lower the frame stages 104a as commanded by the controller 120. The frame lift mechanism 102a moves the frame stages 104a along the direction of the first axis 130.

The frame stages 104a are implemented as moveable stages. The frame stages 104a are connected to the frame lift mechanism 102a and operational to move up and down along the first axis 130. The frame stages 104a are configured to carry the intermediate curved rails 106a along arc-segments 107.

The intermediate curved rails 106a are implemented as arched rails. The intermediate curved rails 106a are mounted on the frame stages 104a. Shapes of the intermediate curved rails 106a form arc-segments around the second axis 132. The intermediate curved rails 106a are configured to provide for rotation of the alignment actuators 108 and the frame carriage 110a around the second axis 132. For purposes of describing the operations, the second (e.g., horizontal) axis 132 and the third (e.g., another horizontal) axis 134 (e.g., the x-y plane) may be considered to relocate with the movement of the frame stages 104a such that radius centers of the intermediate curved rails 106a remain on the second axis 132. In various embodiments, the arc-segments 107 of the intermediate curved rails 106a may span in a range of approximately 20 degrees to approximately 90 degrees. Other ranges may be implemented to meet the design criteria of a particular application.

The alignment actuators 108 are implemented as several (e.g., six) or more linear actuators. The alignment actuators 108 are disposed between the intermediate curved rails 106a and the frame carriage 110a. Each alignment actuator 108 may be oriented nonparallel to the first axis 130, the second axis 132, and the third axis 134. The alignment actuators 108 are configured to slide along the intermediate curved rails 106a to orient the frame carriage 110a about the second axis 132. The alignment actuators 108 are also configured to move the frame carriage 110a in the six degrees of freedom 140. In particular, the alignment actuators 108 move the frame carriage 110a in the left/right motion 140a, the forward/back motion 140b, and the up/down motion 140c, as commanded by the controller 120. The alignment actuators 108 are also configured to adjust an orientation of the frame carriage 110a with the transverse rotation 140d, the longitudinal rotation 140e, and the normal rotation 140f, as commanded by the controller 120.

The frame carriage 110a is implemented as a rigid steel frame. Other rigid materials may be implemented. The frame carriage 110a is coupled to the intermediate curved rails 106a through the alignment actuators 108. The frame carriage 110a is configured to move in the six degrees of freedom 140 relative to the intermediate curved rails 106a to adjust a refined alignment of the frame carriage 110a to the panel 82. The frame carriage 110a is proximate (or near) to the panel 82 while the frame stages 104a are in the engaged position. The frame carriage 110a generally has a curved shape and spans an arc length of at least 180 degrees to accommodate full semicircle-shaped aircraft fuselage frames 88a (e.g., 180-degree frames 88a1, see FIG. 3). Other shapes and lengths of the frame carriage 110a may be implemented to meet a design criteria of a particular application.

The clamp actuators 112 are implemented as linear actuators. The clamp actuators 112 are disposed between the frame carriage 110a and the fixation clamps 114a, and mounted along the curve of the frame carriage 110a. In various embodiments, the clamp actuators 112 are uniformly spaced along the frame carriage 110a. The clamp actuators 112 move in a radial direction as commanded by the controller 120. The radial motion adjusts a spacing between the fixation clamps 114a and the frame carriage 110a to provide bowing and relaxing of the aircraft fuselage frame 88a, and movement of the aircraft fuselage frame 88a into contact with the panel 82.

The fixation clamps 114a are implemented as compression clamps. The fixation clamps 114a are coupled to the frame carriage 110a through the clamp actuators 112, generally one clamp per clamp actuator 112. The fixation clamps 114a are on opposite ends of the clamp actuators 112 as the frame carriage 110a. The fixation clamps 114a couple the part 88 (e.g., a 120-degree frame 88a2 type of part 88 is illustrated, see FIG. 4) to the frame carriage 110a while the frame stages 104a are in the retracted position 152. Coupling is accomplished by compressing the aircraft fuselage frames 88a from two sides with the fixation clamps 114a to achieve a firm grip on the aircraft fuselage frames 88a, as commanded by the controller 120. The fixation clamps 114a are further configured to hold the aircraft fuselage frame 88a in the frame carriage 110a while the frame stages 104a are in transit between the engaged position 154 (see FIG. 7) and the retracted position 152. The fixation clamps 114a are also configured to release the aircraft fuselage frame 88a from the frame carriage 110a while the frame stages 104a are in the engaged position 154 and the frame carriage 110a and the aircraft fuselage frame 88a are aligned to the panel 82.

The frame hard stops 116a are implemented as mechanical stops. The frame hard stops 116a are mounted along the curvature of the frame carriage 110a. The frame hard stops 116a are configured to keep the aircraft fuselage frames 88a on the frame carriage 110a until the aircraft fuselage frames 88a are restrained by the fixation clamps 114a.

The alignment marks 124 are implemented as visual marks along the curvature of the frame carriage 110a. The alignment marks 124 are configured to provide for a coarse alignment of the aircraft fuselage frames 88a on the frame carriage 110a when the aircraft fuselage frames 88a are initially placed on the frame carriage 110a and before the fixation clamps 114a grip the aircraft fuselage frames 88a.

The rigid steel frame carriage 110a with the z-stroke frame lift mechanism 102a allows the aircraft fuselage frames 88a to be loaded underneath the panels 82 while the frame stages 104a and the frame carriage 110a are in the retracted position 152. With the clamp actuators 112 and the fixation clamps 114a, the aircraft fuselage frames 88a can be clamped and moved in a radial direction (see 228, FIG. 8) to bring the aircraft fuselage frames 88a in a tensioned condition that allows the aircraft fuselage frames 88a to be moved into the panels 82 without contacting the stringers 84. The lift mechanism 102a brings the aircraft fuselage frames 88a into the engaged position 154. The alignment actuators 108 provide fine alignment of the aircraft fuselage frames 88a with the stringers 84.

Once the aircraft fuselage frames 88a have been brought into contact with the stringers 84, the fixation clamps 114a extend to release the tension thereby allowing the aircraft fuselage frames 88a to align with a curvature of the panel 82 in a nominal position. The clamp actuators 112 subsequently push the aircraft fuselage frame 88a against the panels 82 and in a manual process all feet on the aircraft fuselage frame 88a may be tacked to the panel 82. After the tacking process is completed, the clamp actuators 112 and the fixation clamps 114a are retracted and frame carriage 110a is lowered down to clear the area. The frame positioning tool 100a provides an ability to install the 180-degree frames 88a1 in a 180-degree panel 82 with stringers 84 that are preinstalled. The frame positioning tool 100a provides a low footprint that allows the workers 70 access from both sides of the aircraft fuselage frames 88a. The frame positioning tool 100a may install the aircraft fuselage frames 88a without any restriction to the arc length 158 (see FIG. 7).

Figure 3:
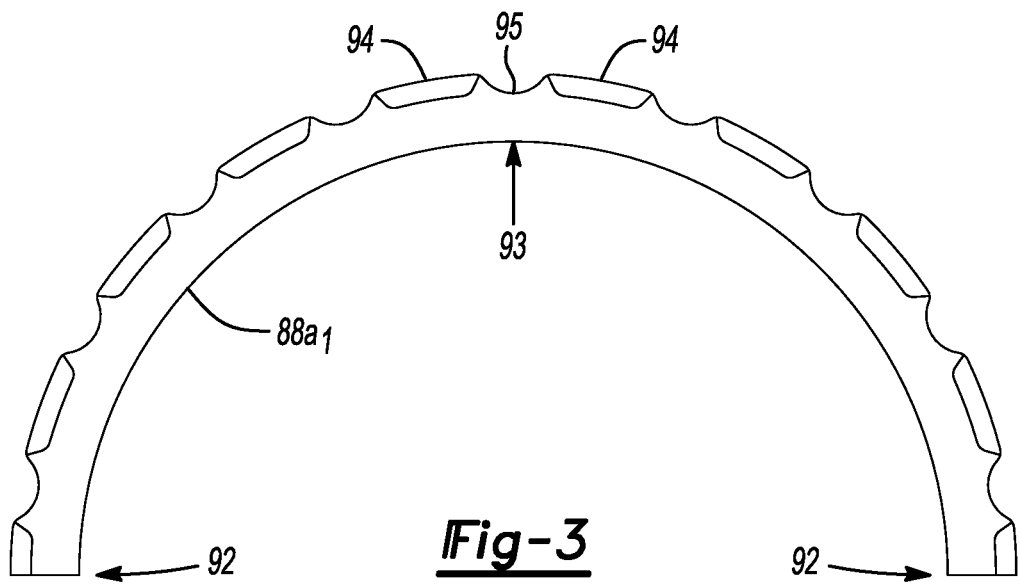
FIG. 3 is a schematic diagram of an implementation of a 180-degree frame in accordance with one or more exemplary embodiments.

Referring to FIG. 3, a schematic diagram of an example implementation of a 180-degree frame 88a1 is shown in accordance with one or more exemplary embodiments. The 180-degree frame 88a1 spans half a circle to match half barrel sized fuselages 81. The 180-degree frame 88a1 includes two opposing ends 92 and a point 93 half way between the two opposing ends 92. Multiple feet 94 (or flanges) extend away from the 180-degree frame 88a1 along the outer edge of the 180-degree frame 88a1. The feet 94 are used to secure the 180-degree frame 88a1 to one or more panels 82. Multiple mouse holes 95 are formed in the 180-degree frame 88a1 along the outer edge and spaced apart from the feet 94. The mouse holes 95 exist in the 180-degree frame 88a1 to provide space in the hoopwise-arranged 180-degree frames 88a1 for the longitudinally running stringers 84 as the 180-degree frame 88a1 is mounted on the panels 82

Figure 4:
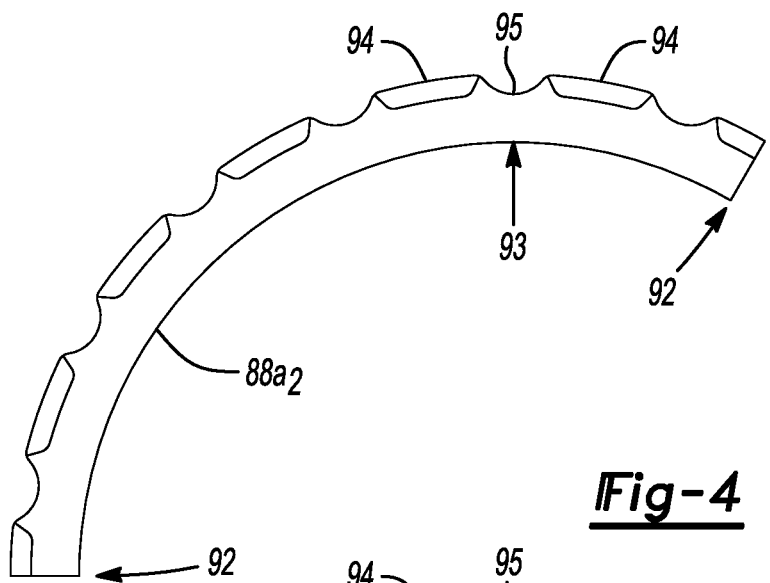
FIG. 4 is a schematic diagram of an implementation of a 120-degree frame in accordance with one or more exemplary embodiments.

Referring to FIG. 4, a schematic diagram of an example implementation of a 120-degree frame 88a2 is shown in accordance with one or more exemplary embodiments. The 120-degree frame 88a2 spans two-thirds a circle. The 120-degree frame 88a2 includes the two opposing ends 92, with the point 93 three-quarters of the way between the two opposing ends 92. Multiple feet 94 (or flanges) extend away from the 120-degree frame 88a2 along the outer edge of the 120-degree frame 88a2. The feet 94 are used to secure the 120-degree frame 88a2 to one or more panels 82. Multiple mouse holes 95 are formed in the 120-degree frame 88a2 along the outer edge and spaced apart from the feet 94. The mouse holes 95 exist in the 120-degree frame 88a2 to provide space in the hoopwise-arranged 120-degree frames 88a2 for the longitudinally running stringers 84 as the 120-degree frame 88a2 is mounted on the panels 82.

Figure 5:
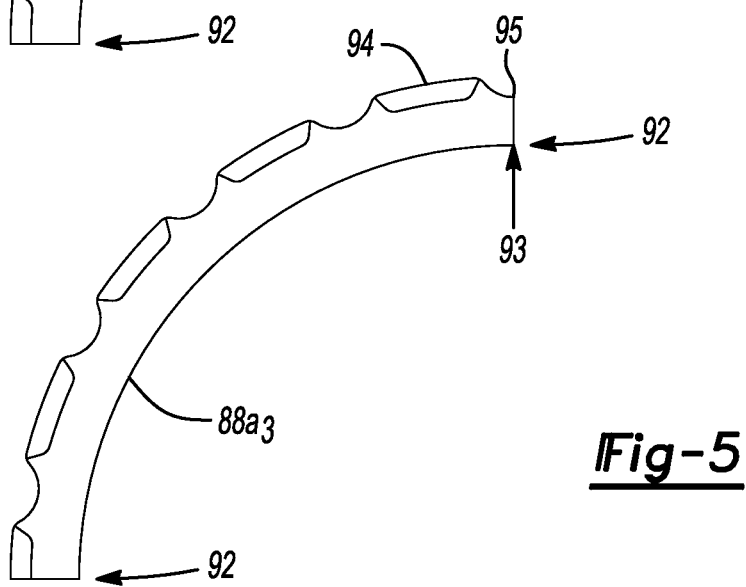
FIG. 5 is a schematic diagram of an implementation of a 90-degree frame in accordance with one or more exemplary embodiments.

Referring to FIG. 5, a schematic diagram of an example implementation of a 90-degree frame 88a3 is shown in accordance with one or more exemplary embodiments. The 90-degree frame 88a3 spans a quarter circle. The 90-degree frame 88a3 includes the two opposing ends 92, with the point 93 co-located at one of the two opposing ends 92. Multiple feet 94 (or flanges) extend away from the 90-degree frame 88a3 along the outer edge of the 90-degree frame 88a3. The feet 94 are used to secure the 90-degree frame 88a3 to one or more panels 82. Multiple mouse holes 95 exist in the 90-degree frame 88a3 to provide space in the hoopwise-arranged 90-degree frames 88a3 for the longitudinally running stringers 84 as the 90-degree frame 88a3 is mounted on the panels 82.

Figure 6:
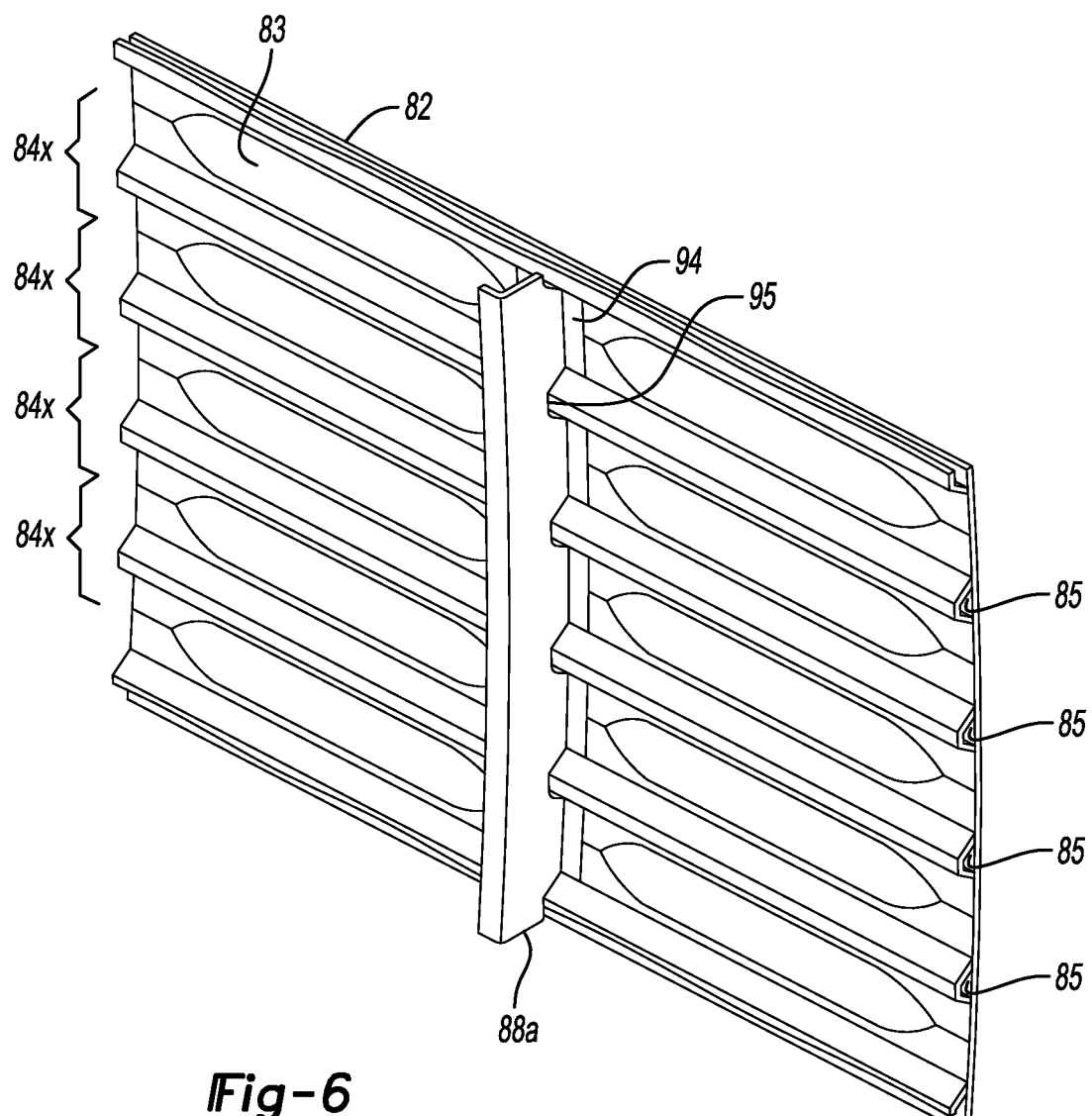
FIG. 6 is a schematic perspective diagram of a portion of an aircraft fuselage frame mounted on a panel in accordance with one or more exemplary embodiments.

Referring to FIG. 6, a schematic perspective diagram of an example portion of an aircraft fuselage frame 88a mounted on a panel 82 is shown in accordance with one or more exemplary embodiments. The panel 82 as illustrated includes multiple hat section stringer 84x running longitudinally (horizontally) on an inner mold line surface 83 of the panel 82. Each hat section stringer 84x includes a hat portion 85. While the hoopwise-arranged aircraft fuselage frame 88a (e.g., 180-degree, 120-degree, 90-degree, 45-degree, or the like) is attached to the panel 82, the feet 94 of the aircraft fuselage frame 88a are attached to the inner mold line surface 83 of the panel 82. The mouse holes 95 of the aircraft fuselage frame 88a provide space for the hat section stringers 84x to reside between the aircraft fuselage frame 88a and the inner mold line surface 83.

Figure 7:
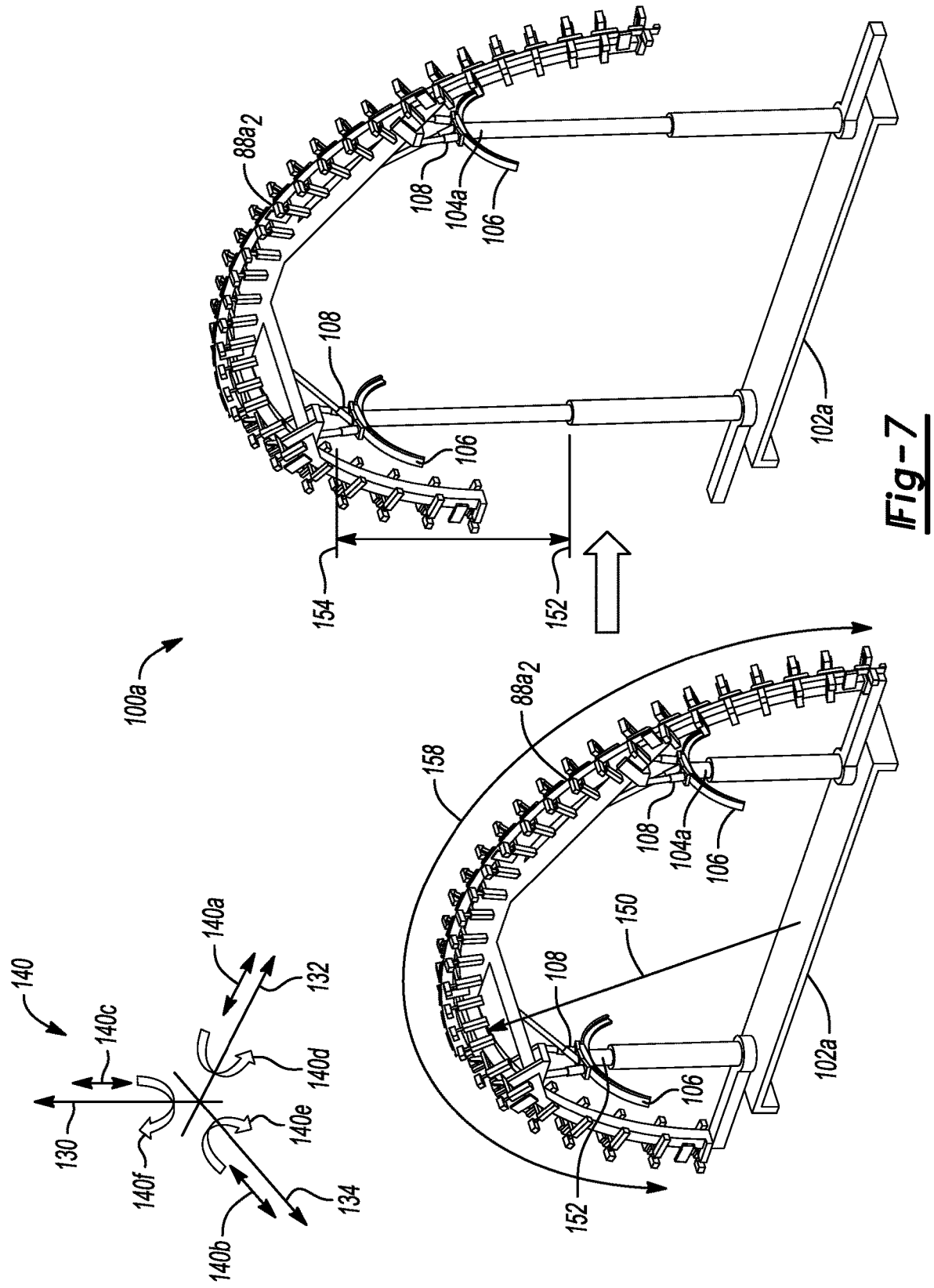
FIG. 7 is a schematic diagram of movements of the frame positioning tool in accordance with one or more exemplary embodiments.

Referring to FIG. 7, a schematic diagram of an example movement of the frame positioning tool 100a is shown in accordance with one or more exemplary embodiments. The frame lift mechanism 102a of the frame positioning tool 100a is disposable inside the apparatus 80 and in an initial alignment with a panel 82 inside the apparatus 80 (e.g., aligned to the stringers 84, or the area that is or will become a panel opening 86). The frame lift mechanism 102a is operable to move the frame stages 104a linearly along the first (e.g., vertical) axis 130 between a retracted position 152 and an engaged position 154. The retracted position 152 is a lowered position where the aircraft fuselage frames 88a (e.g., a 120-degree frame 88a2 is shown) are mounted to the frame carriage 110a and aligned to the alignment marks 124 (see FIG. 2) by moving the aircraft fuselage frames 88a along the arc length 158. The engaged position 154 is a raised position where the aircraft fuselage frames 88a are attached to the panels 82. The frame carriage 110a has a semicircle shape with a radius 150. The radius 150 may be shorter than an inner radius of the panel 82.

Figure 8:
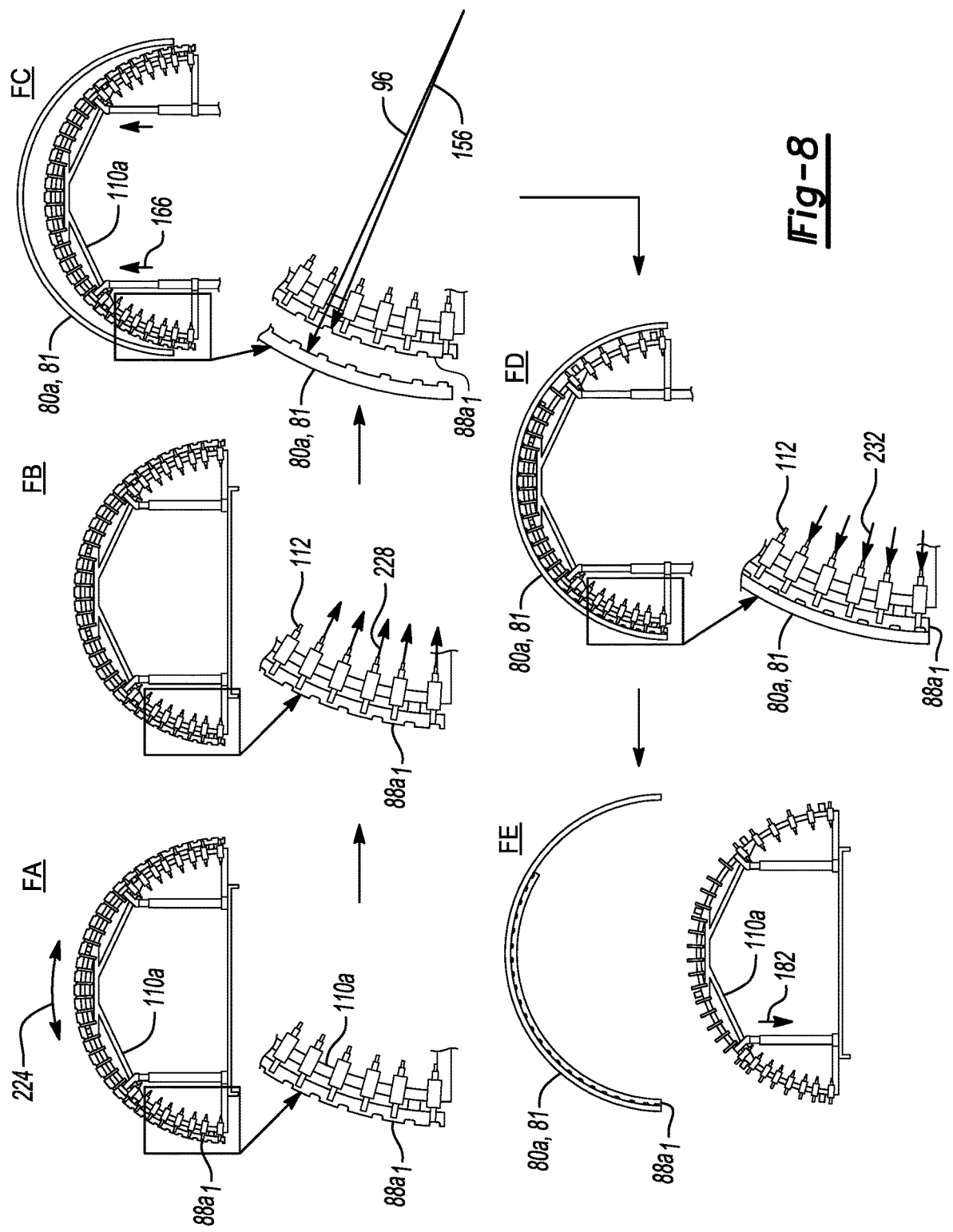
FIG. 8 is a schematic diagram of a sequence of installation steps for an aircraft fuselage frame in accordance with one or more exemplary embodiments.

Referring to FIG. 8, a schematic diagram of an example sequence of installation steps for an aircraft fuselage frame 88a in an aircraft 80a is shown in accordance with one or more exemplary embodiments. The aircraft 80a is partially assembled with an upper half (e.g., a half barrel shape) of the fuselage 81 shown. The half of the fuselage 81 being assembled may be either an upper half with assembly access from below or a lower half in an inverted position with assembly access through the ends or from below. When ready for joining the lower half is inverted and joined to the upper half to form the full fuselage 81. The sequence may include multiple (e.g., five) steps, labeled FA-FE in the figure. The aircraft 80a is a variation of the apparatus 80.

In the step FA, the frame positioning tool 100a is in the retracted position 152 (see FIG. 7) and the aircraft fuselage frame 88a (e.g., a 180-degree frame 88a1 is illustrated) is loaded into the frame carriage 110a. The aircraft fuselage frame 88a is also positioned (step 224) at a location along the frame carriage 110a to achieve alignment with an appropriate one or more of the alignment marks 124 (see FIG. 2). Such a positioning is the hoopwise alignment of the aircraft fuselage frame 88a relative to the half of the fuselage 81 being assembled. Hoopwise is in the cylindrical direction as typically when the upper half of the fuselage 81 is joined to the lower half of the fuselage 81. In the step FB, the fixation clamps 114a are closed and the clamp actuators 112 are retracted to put the aircraft fuselage frame 88a into tension with a retracted radius of curvature 156 (see FIG. 8). The tension places the aircraft fuselage frame 88a in a bowed arrangement so that the mouse holes 95 can be aligned with the longitudinally arranged stringers 84 and the feet 94 between the mouse holes 95 can clear the stringers 84 when the aircraft fuselage frame 88a is raised vertically. The frame carriage 110a carrying the aircraft fuselage frame 88a is moved into the engaged position 154 (see FIG. 7) in the step FC. While in the engaged position 154, the feet 94 of the aircraft fuselage frame 88a are near the panel 82 as the retracted radius of curvature 156 is less than the relaxed radius of curvature 96 of both the aircraft 80a and the aircraft fuselage frame 88a. The aircraft fuselage frame 88a in tension at the retraced radius of curvature 156 allows the mouse holes 95 to slip over and align with the stringers 84 and the feet 94 between the mouse holes 95 can clear the stringers 84 when the aircraft fuselage frame 88a is placed vertically.

In the step FD, the frame carriage 110a and the aircraft fuselage frame 88a are moved into an installation position by extending the clamp actuators 112. The movement generally causes the feet 94 of the aircraft fuselage frame 88a to press against the panel 82 of the aircraft 80a with a small force (e.g., approximately 10 to 14 pounds). The movement also causes the two opposing ends 92 of the aircraft fuselage frame 88a to move from the bowed condition to the relaxed condition, ready for tacking into place. As the feet 94 contact the panel 82, the clamp actuators 112 may press the feet 94 against the panel 82. A manual tacking of the feet 94 to the panel 82 may be performed by the workers 70.

In various embodiments, after the aircraft fuselage frame 88a makes initial contact to a stringer 84, the clamp actuators 112 are set to a floating mode and the aircraft fuselage frame 88a is allowed to relax to the relaxed radius of curvature 96. By releasing the tension, the mouse holes 95 of the aircraft fuselage frame 88a align with the stringers 84 of the panel 82 and the frame state changes from a mounting condition to an assembly condition. The clamp actuators 112 are subsequently extended to press and hold the feet 94 against the panel 82. Afterwards, the feet 94 may be tacked to the panel 82. In other embodiments, the tacking may be performed gradually starting from the point 93 and moving outward toward the two opposing ends 92. Hence, the clamp actuators 112 may hold the aircraft fuselage frame 88a in place and extend gradually as the tacking progresses. In some embodiments, the aircraft fuselage frame 88a to be progressively tacked in placed as the aircraft fuselage frame 88a is gradually relaxed from the bowed state progressively bringing the feet 94 into contact with the inner mold line surface 83 of the panel 82. In still other embodiments, the aircraft fuselage frame 88a is positioned relative to the inner mold line surface 83 and then relaxed to bring the feet 94 into contact with the inner mold line surface 83 before the feet 94 are tacked to the panel 82. In the step FE, the fixation clamps 114a may release from the aircraft fuselage frame 88a, the clamp actuators 112 retracted, and the frame lift mechanism 102a moves back to the retracted position 152 (see FIG. 7). The sequence may subsequently be repeated with additional aircraft fuselage frames 88a.

Figure 9:
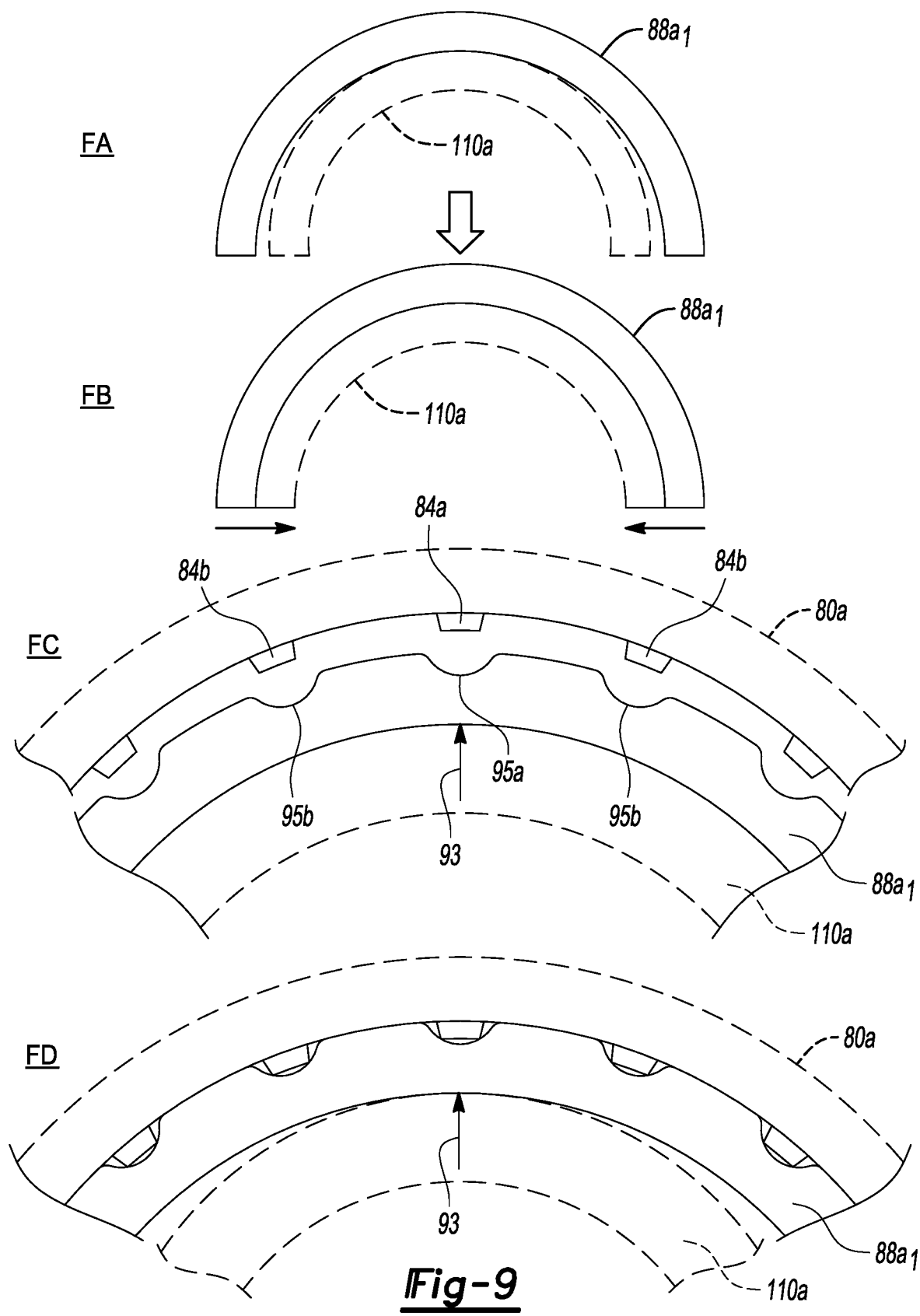
FIG. 9 is a schematic diagram illustrating movements of a 180-degree frame while being installed in accordance with one or more exemplary embodiments.

Referring to FIG. 9, a schematic diagram illustrating example movements of a 180-degree frame 88a1 while being installed is shown in accordance with one or more exemplary embodiments. The movements may involve the four steps FA-FD shown in FIG. 8. In the step FA, the 180-degree frame 88a1 is relaxed when placed on the frame carriage 110a. The two opposing ends 92 are moved inward (toward each other) to place the 180-degree frame 88a1 under tension against the frame carriage 110a in the step FB. With the 180-degree frame 88a1 still under tension, a center mouse hole 95a of the 180-degree frame 88a1 is aligned with a center stringer 84a of the panel 82 in the step FC. With the point 93 (e.g., the upper portion of the arc) of the 180-degree frame 88a1 in contact with the panel 82, the two opposing ends 92 are moved outward (away from each other) in the step FD to release the tension on the 180-degree frame 88a1. As the tension starts to release, the neighboring mouse holes 95b on either side of the center mouse hole 95a envelop the neighboring stringers 84b on either side of the center stringer 84a. As the tension continues to release, additional pairs of the mouse holes 95 envelop additional pairs of the stringers 84 until the tension is completely released.

Figure 10:
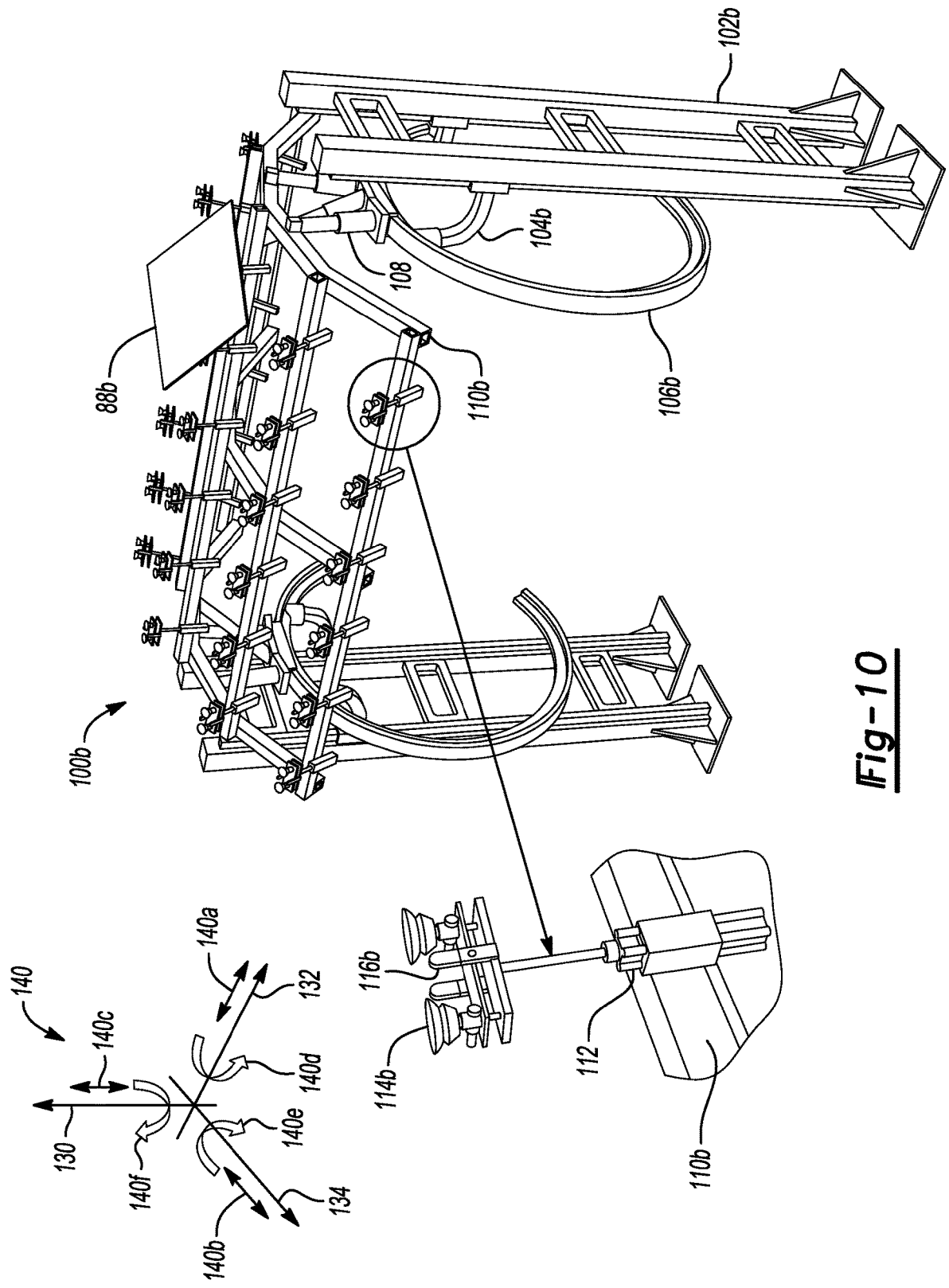
FIG. 10 is a schematic diagram of a cutout positioning tool in accordance with one or more exemplary embodiments.

Referring to FIG. 10, a schematic diagram of an example implementation of a cutout positioning tool 100b is shown in accordance with one or more exemplary embodiments. The cutout positioning tool 100b may be a variation of the positioning tool 100. The cutout positioning tool 100b includes a part lift mechanism 102b, multiple part stages 104b, multiple extended curved rails 106b, multiple alignment actuators 108, a cutout carriage 110b, multiple clamp actuators 112, multiple suction cups (or suction clamps) 114b arranged in a two-dimensional array, and multiple cutout hard stops 116b. The components of the cutout positioning tool 100b are variations of, and in some cases the same as the components of the frame positioning tool 100a. The part stages 104b may be shaped to hold the extended curved rails 106b horizontally offset from the part lift mechanism 102b. In various embodiments, the arc-segments 107 of the extended curved rails 106b may arch in a range of approximately 90 degrees to 300 degrees. Other ranges may be implemented to meet the design criteria of a particular application.

The cutout positioning tool 100b is configured to aid in the removal of the cutouts 88b. The cutout positioning tool 100b is operational to move the cutout carriage 110b in the six degrees of freedom 140 to align the suction cups 114b to correct cutting positions anywhere inside the apparatus 80. By implementing the array of suction cups 114b, the cutout positioning tool 100b is operational to pick up and hold any size and/or shape of cutout 88b. The suction cups 114b generally hold the cutouts 88b against the cutout hard stops 116b while the cutout is being separated from the panel 82.

Figure 11:
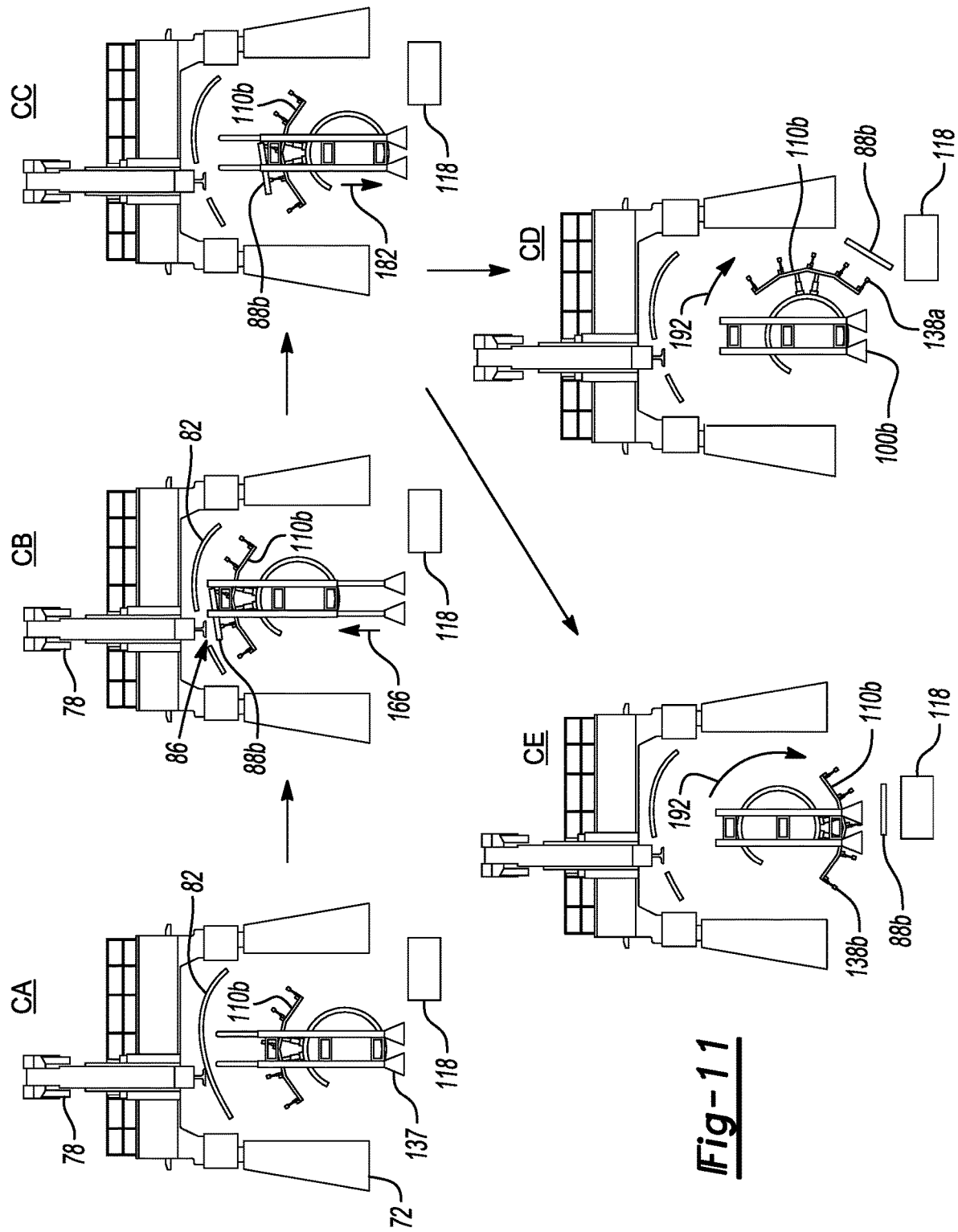
FIG. 11 is a schematic diagram of a sequence of removal steps for a cutout in accordance with one or more exemplary embodiments.

Referring to FIG. 11, a schematic diagram of an example sequence of removal steps for a cutout 88b is shown in accordance with one or more exemplary embodiments. The sequence may include multiple (e.g., five) steps, labeled CA-CE in the figure. The cutting may be performed in a cutout station within the manufacturing system 60. In various embodiments, the cutout station may be separate from an installation station with the apparatus 80 moved from one station to the next. In other embodiments, the apparatus 80 may remain stationary as the various positioning tools 100 are moved underneath the apparatus 80 as appropriate for the tasks being performed.

In the step CA, the cutout lift mechanism 102b is moved into a working position 137 approximately aligned with a position on a portion of the panel 82 about to be removed. From the working position 137, the cutout carriage 110b has no interference contour for moving to the panel 82. During the cutout process step CB, the cutout carriage 110b is raised (moved in a direction of the step 166) to support the panel 82 from the inside while the milling head 78 is working from the outside of the panel 82. Using the movement and rotation capabilities of the cutout positioning tool 100b, the suction cups 114b are finely moved into an aligned position relative to the portion of the panel 82 about to be removed. A vacuum system (not shown) is activated to cause the suction cups 114b to support the panel 82 being cut from the inside. The vacuum activation may be restricted to various zones of the suction cups 114b where small-area cuts (e.g., window cuts, door cuts, and the like) will be performed.

After finishing the milling operation, the cutout carriage 110b is coupled to the cutout 88b. In the step CC, the cutout carriage 110b is lowered down while still holding the vacuum for the cutout 88b. In various embodiments, the cutout carriage 110b subsequently moves along the extended curved rails 106b (movement step 192) to a side recycling position 138a in the step CD where the vacuum is released. While in the side recycling position 138a, the cutouts 88b fall into the bin system 118 for recycling or disposal. In other embodiments, the cutout carriage 110b moves along the extended curved rails 106b (movement step 192) to a bottom recycling position 138b where the vacuum is released and the cutout 88b transfers into the bin system 118 by gravity.

Figure 12:
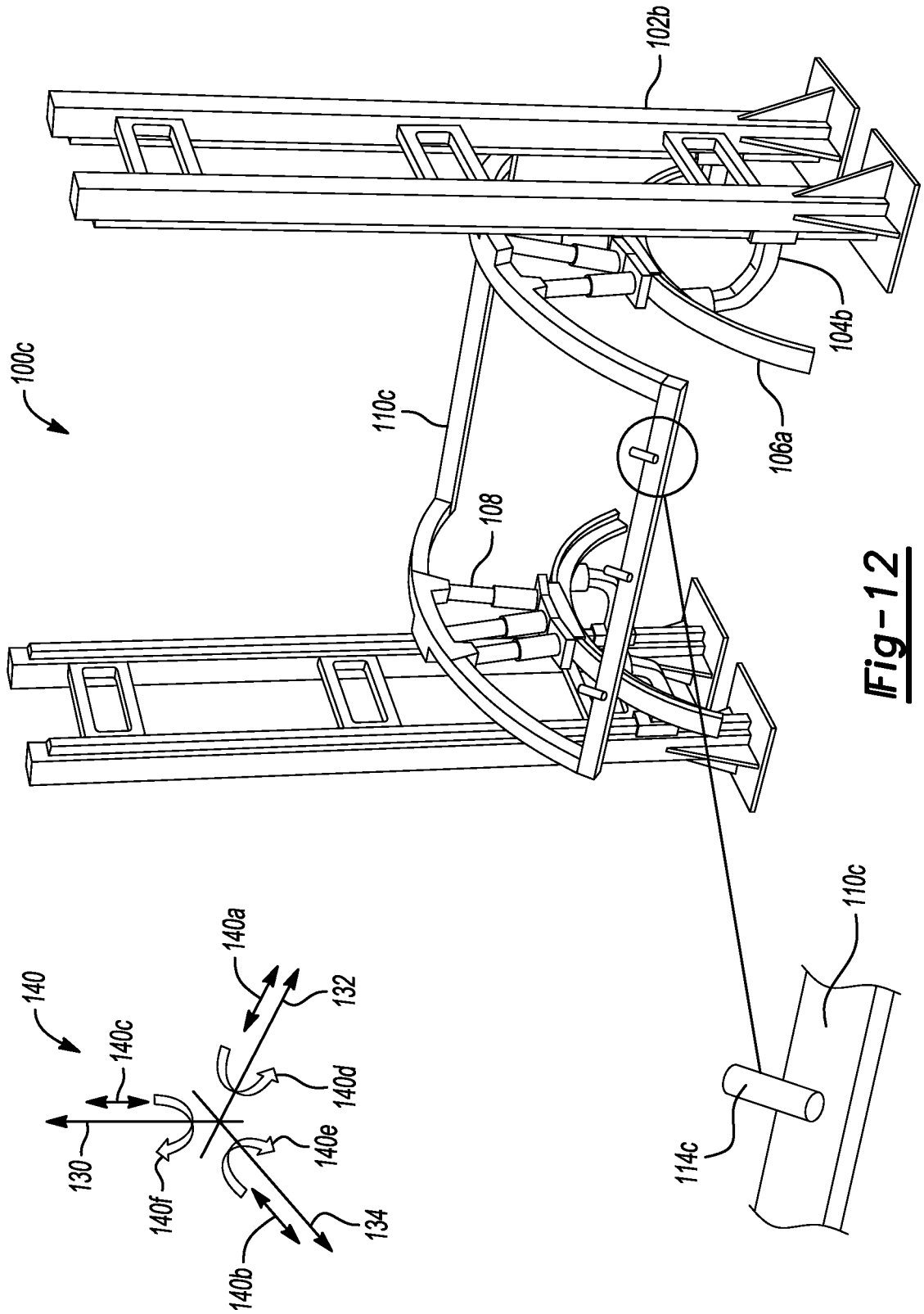
FIG. 12 is a schematic diagram of a door surround positioning tool in accordance with one or more exemplary embodiments.

Referring to FIG. 12, a schematic diagram of an example implementation of a surround positioning tool 100c is shown in accordance with one or more exemplary embodiments. The surround positioning tool 100c may be a variation of the positioning tool 100. The surround positioning tool 100c includes the part lift mechanism 102b, multiple part stages 104b, the multiple intermediate curved rails 106a, the multiple alignment actuators 108, a surround carriage 110c, the multiple clamp actuator 112, and multiple jig clamps 114c. The components of the surround positioning tool 100c are variations of, and in some cases the same as the components of the frame positioning tool 100a and/or the cutout positioning tool 100b.

The surround positioning tool 100c generally allows pick-up and placement of many types of the door surrounds 88c1 and associated door preassembly jigs 90a and/or the window surrounds 88c2 and associated window preassembly jigs 90b. In various embodiments, the door surrounds 88c1 or the window surrounds 88c2 may be placed in the surround positioning tool 100c on a lower level (e.g., the ground 62 level) of the manufacturing system 60 and raised to a height of the apparatus 80. The movement and rotation capabilities of the surround positioning tool 100c provide for fine positioning with the six degrees of freedom 140. The fine positioning of door surround 88c1 and the window surround 88c2 to the panel 82 is controllable by the workers 70 using the hand controls 122 to adjust the alignment actuators 108.

The surround positioning tool 100c is a flexible and universal solution for all door surrounds 88c1 and all window surrounds 88c2 because the jig clamps 114c on a surround carriage 110c engage between a base frame on the panel 82 and the door surround 88c1 and the window surround 88c2. The jig clamps 114c allow the possibility to install a variety of door surrounds 88c1 and/or a variety of window surrounds 88c2 with a single positioning tool. Other types of surrounds may be adapted to the surround positioning tool 100c using appropriate preassembly jigs.

Figure 13:
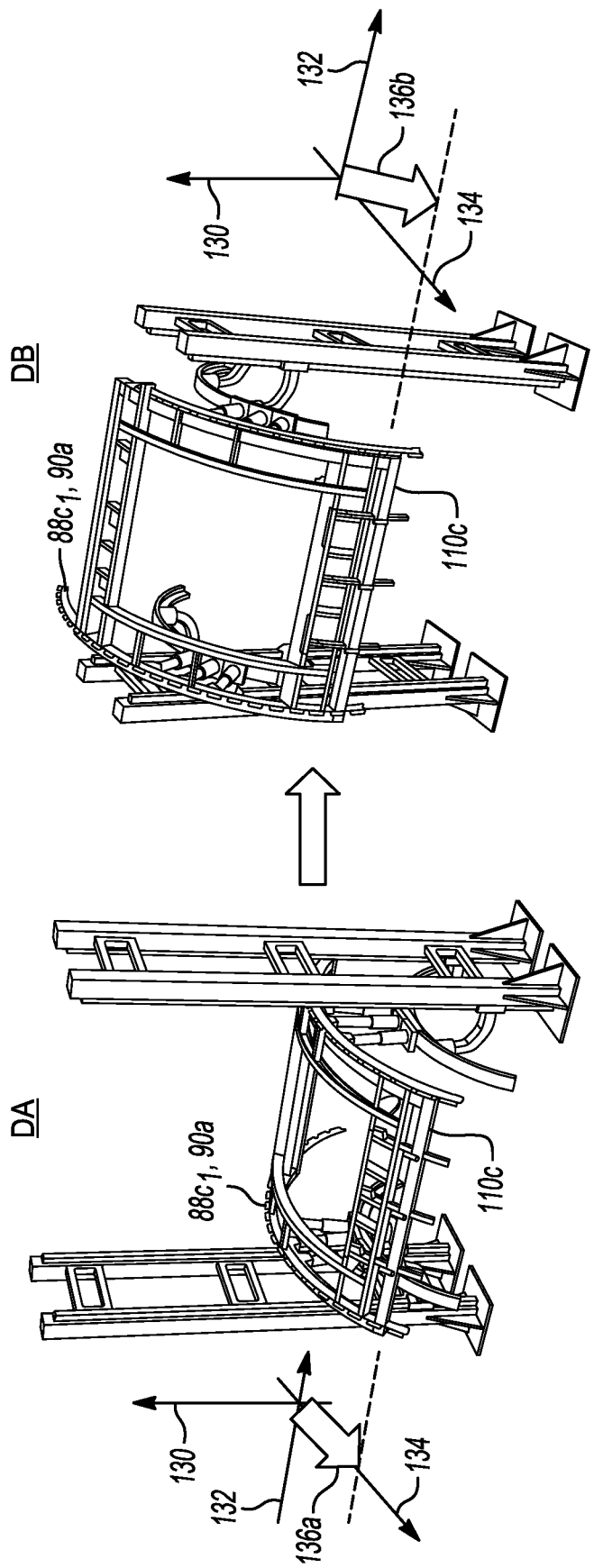
FIG. 13 is a schematic diagram of a sequence of installation steps for a door surround in accordance with one or more exemplary embodiments.

Referring to FIG. 13, a schematic diagram of an example sequence of installation steps for a door surround 88c1 is shown in accordance with one or more exemplary embodiments. The sequence may include multiple (e.g., two) steps, labeled DA-DB in the figure. In the step DA, a door surround 88c1 coupled to a door preassembly jig 90a is loaded into the surround carriage 110c while the surround positioning tool 100c is underneath the scaffold 72 and in the retracted position 152, and the surround carriage 110c is in an access orientation 136a. When the floor 74 on the scaffold 72 above the surround positioning tool 100c is cleared and opened, the door surround 88c1 and the door preassembly jig 90a are lifted with the part lift mechanism 102b to an upper staging level. The door surround 88c1 and the door preassembly jig 90a are subsequently moved near an installation position on the intermediate curved rail 106a and rotated to an install orientation 136b in the step DB. The final alignment of the door surround 88c1 to the door panel opening 86a is accomplished by a manual fine positioning by the workers 70 using the hand controls 122. The fine positioning allows the door surround 88c1 to move in the six degrees of freedom 140. Once in the correct position, the door surround 88c1 is fastened to the surrounding inner structure and tacked to the panel 82. The surround positioning tool 100c is then disconnected from the door surround 88c1 and lowered down underneath the upper staging level.

Figure 14:
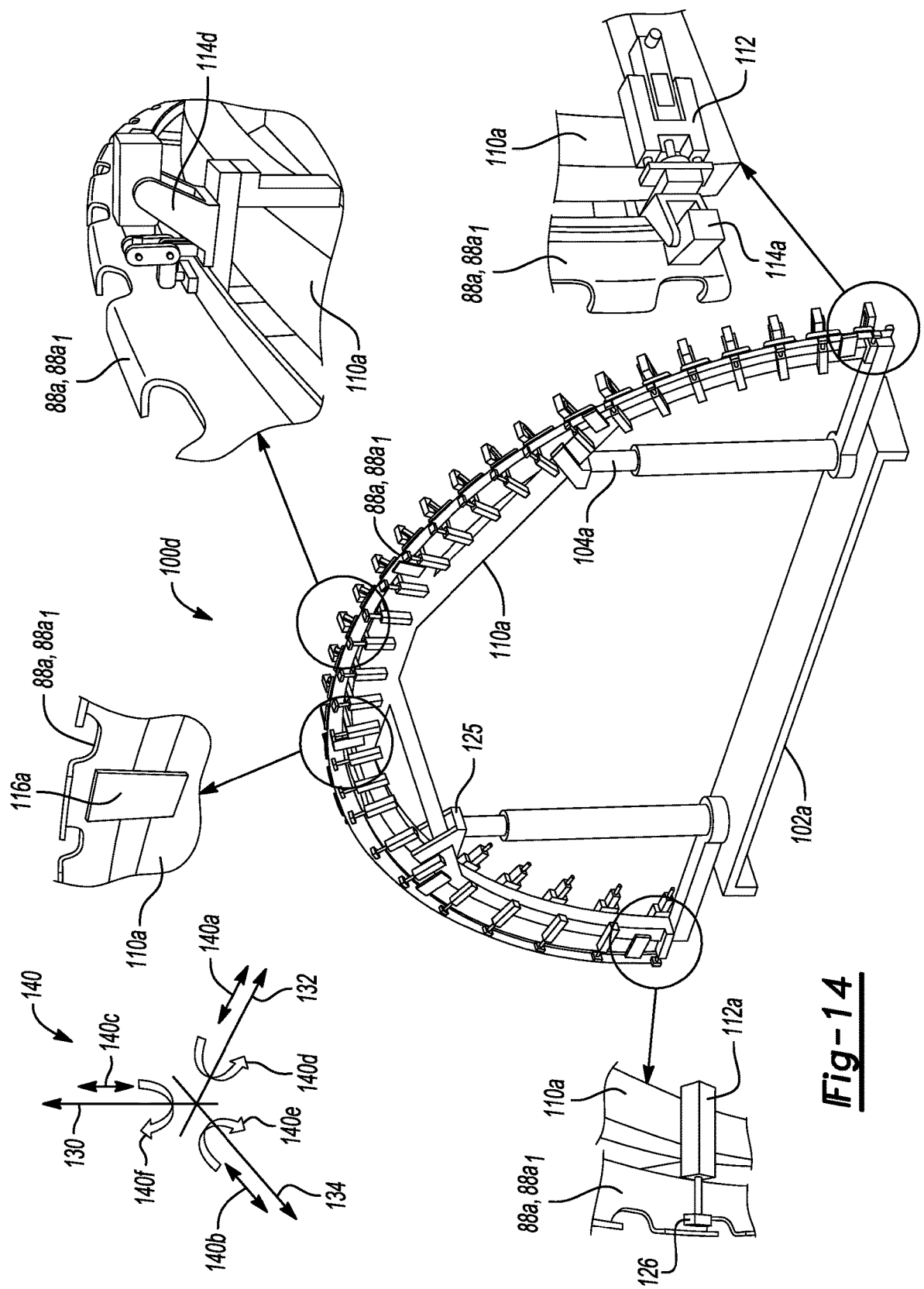
FIG. 14 is a schematic diagram of another frame positioning tool in accordance with one or more exemplary embodiments.

Referring to FIG. 14, a schematic diagram of an example implementation of another frame positioning tool 100d is shown in accordance with one or more exemplary embodiments. The frame positioning tool 100d may be a variation of the positioning tool 100 and/or the frame positioning tool 100a. The frame positioning tool 100d includes the frame lift mechanism 102a, the multiple frame stages 104a, the frame carriage 110a, the multiple clamp actuator 112, multiple foot actuators 112a, and multiple retainer clamps 114d, the multiple fixation clamps 114a, the multiple frame hard stops 116a, the one or more alignment marks 124 (see FIG. 2), and an XY float table 125. The frame positioning tool 100d is configured to aid in the installation of the aircraft fuselage frames 88a (e.g., a 180-degree frame 88a1 is illustrated) While a 180-degree frame 88a1 is illustrated (also see FIG. 3), shorter aircraft fuselage frames 88a may be installed using the frame positioning tool 100d, such as a 120-degree frame 88a2 (see FIG. 4) and a 90-degree frame 88a3 (see FIG. 5). Other sizes of the aircraft fuselage frames 88a (e.g., 45-degree frames) may be implemented to meet the design criteria of a particular application.

The aircraft fuselage frames 88a may be manipulated by the frame positioning tool 100d in the Cartesian coordinate system that defines the first (e.g., z or vertical) axis 130, the second (e.g., x or horizontal) axis 132, and the third (e.g., y or another horizontal) axis 134. The axes 130, 132, and 134 are perpendicular to each other. The frame positioning tool 100d is configured to orient the aircraft fuselage frames 88a in four degrees of freedom 140. The four degrees include three motions: the left/right (or sway) motion 140a along the second axis 132; the forward/backward (or surge) motion 140b along the third axis 134; and the up/down (or heave) motion 140c along the first axis 130. A degree of freedom includes the longitudinal rotation (or roll) 140e about the third axis 134.

The left/right motion 140a is achieved by movement of the XY float table 125 (or XY translation stage). The forward/backward motion 140b is achieved by movement of the XY float table 125. The up/down motion 140c is achieved by moving the frame stages 104a. The longitudinal rotation (or roll) 140e about the third axis 134 is achieved by manual placement of the aircraft fuselage frames 88a in the frame carriage 110a.

The frame carriage 110a is implemented as a rigid steel frame. Other rigid materials may be implemented. The frame carriage 110a is coupled to the frame stages 104a through the XY float table 125. The frame carriage 110a is configured to move in two degrees of freedom 140 relative to the frame stages 104a to adjust a refined alignment of the frame carriage 110a to the panel 82. The frame carriage 110a is proximate (or near) to the panel 82 while the frame stages 104a are in the engaged position. The frame carriage 110a generally has a curved shape and spans an arc length of at least 180 degrees to accommodate full semicircle-shaped aircraft fuselage frames 88a (e.g., 180-degree frames 88a1, see FIG. 3). Other shapes and lengths of the frame carriage 110a may be implemented to meet a design criteria of a particular application.

The clamp actuators 112 are implemented as linear actuators. The clamp actuators 112 are disposed between the frame carriage 110a and the fixation clamps 114a, and mounted along the curve of the frame carriage 110a. In various embodiments, several clamp actuators 112 are disposed at the ends of the frame carriage 110a, on one side of the aircraft fuselage frame 88a, and opposite the frame hard stops 116a. The clamp actuators 112 move in a radial direction as commanded by the controller 120. The radial motion adjusts a spacing between the fixation clamps 114a and the frame carriage 110a to provide bowing and relaxing of the aircraft fuselage frame 88a.

The fixation clamps 114a are implemented as compression clamps. The fixation clamps 114a are coupled to the frame carriage 110a through the clamp actuators 112, generally one clamp per clamp actuator 112. The fixation clamps 114a are on opposite ends of the clamp actuators 112 as the frame carriage 110a. The fixation clamps 114a couple the aircraft fuselage frame 88a (e.g., a 120-degree frame 88a2 is illustrated, also see FIG. 4) to the frame carriage 110a while the frame stages 104a are in the retracted position 152. Coupling is accomplished by compressing the aircraft fuselage frame 88a from one side by the fixation clamps 114a against the frame hard stops 116a on the other side to achieve a firm grip on the aircraft fuselage frames 88a, as commanded by the controller 120. The fixation clamps 114a are further configured to hold the aircraft fuselage frame 88a in the frame carriage 110a while the frame stages 104a are in transit between the engaged position 154 (see FIG. 7) and the retracted position 152. The fixation clamps 114a are also configured to release the aircraft fuselage frame 88a from the frame carriage 110a while the frame stages 104a are in the engaged position 154 and the frame carriage 110a and the aircraft fuselage frame 88a are aligned to the panel 82.

The retainer clamps 114d are implemented as compression clamps. The retainer clamps 114d are coupled directly to the frame carriage 110a. Several retainer clamps 114d are disposed centrally on the curvature of the frame carriage 110a. The retainer clamps 114d couple the aircraft fuselage frame 88a to the frame carriage 110a while the frame stages 104a are in the retracted position 152. Coupling is accomplished by compressing a ledge 98 of the aircraft fuselage frames 88a against the frame carriage 110a, as commanded by the controller 120. The retainer clamps 114d are further configured to hold the aircraft fuselage frame 88a in the frame carriage 110a while the frame stages 104a are in transit between the engaged position 154 (see FIG. 7) and the retracted position 152. The retainer clamps 114d are also configured to release the aircraft fuselage frame 88a from the frame carriage 110a while the frame stages 104a are in the engaged position 154 and the frame carriage 110a and the aircraft fuselage frame 88a are aligned to the panel 82.

The frame hard stops 116a are implemented as mechanical stops. The frame hard stops 116a are mounted along the curvature of the frame carriage 110a. The frame hard stops 116a are configured to keep the aircraft fuselage frames 88a on the frame carriage 110a (e.g., in the +140b direction) while the fixation clamps 114a and the retainer clamps 114d, are pressing against the aircraft fuselage frame 88a.

The rigid steel frame carriage 110a with the z-stroke frame lift mechanism 102a allows the aircraft fuselage frames 88a to be loaded underneath the panels 82 while the frame stages 104a and the frame carriage 110a are in the retracted position 152. With the clamp actuators 112, the fixation clamps 114a, the retainer clamps 114d, and the frame hard stops 116a, the aircraft fuselage frames 88a can be clamped and moved in a radial direction (see 228, FIG. 8) to bring the aircraft fuselage frames 88a in a tensioned condition that allows the aircraft fuselage frames 88a to be moved into the panels 82 without contacting the stringers 84. The lift mechanism 102a brings the aircraft fuselage frames 88a into the engaged position 154. The XY float table 125 provides fine alignment of the aircraft fuselage frames 88a with the stringers 84.

Once the aircraft fuselage frames 88a have been brought into contact with the stringers 84, the clamp actuators 112 are set to a floating mode by the controller 120 to release the tension thereby allowing the aircraft fuselage frames 88a to align with a curvature of the panel 82 in a nominal position. The foot actuators 112a and foot pads 126 subsequently push the aircraft fuselage frame 88a against the panels 82 and in a manual process all feet 94 on the aircraft fuselage frame 88a retainer may be tacked to the panel 82. After the tacking process is completed, the clamp actuators 112, the foot actuators 112a, and the fixation clamps 114a are retracted and frame carriage 110a is lowered down to clear the area. The frame positioning tool 100d provides an ability to install the 180-degree frames 88a1 in a 180-degree panel 82 with stringers 84 that are preinstalled. The frame positioning tool 100d provides a low footprint that allows the workers 70 access from both sides of the aircraft fuselage frames 88a. The frame positioning tool 100d may install the aircraft fuselage frames 88a without any restriction to the arc length 158 (see FIG. 7).

Figure 15:
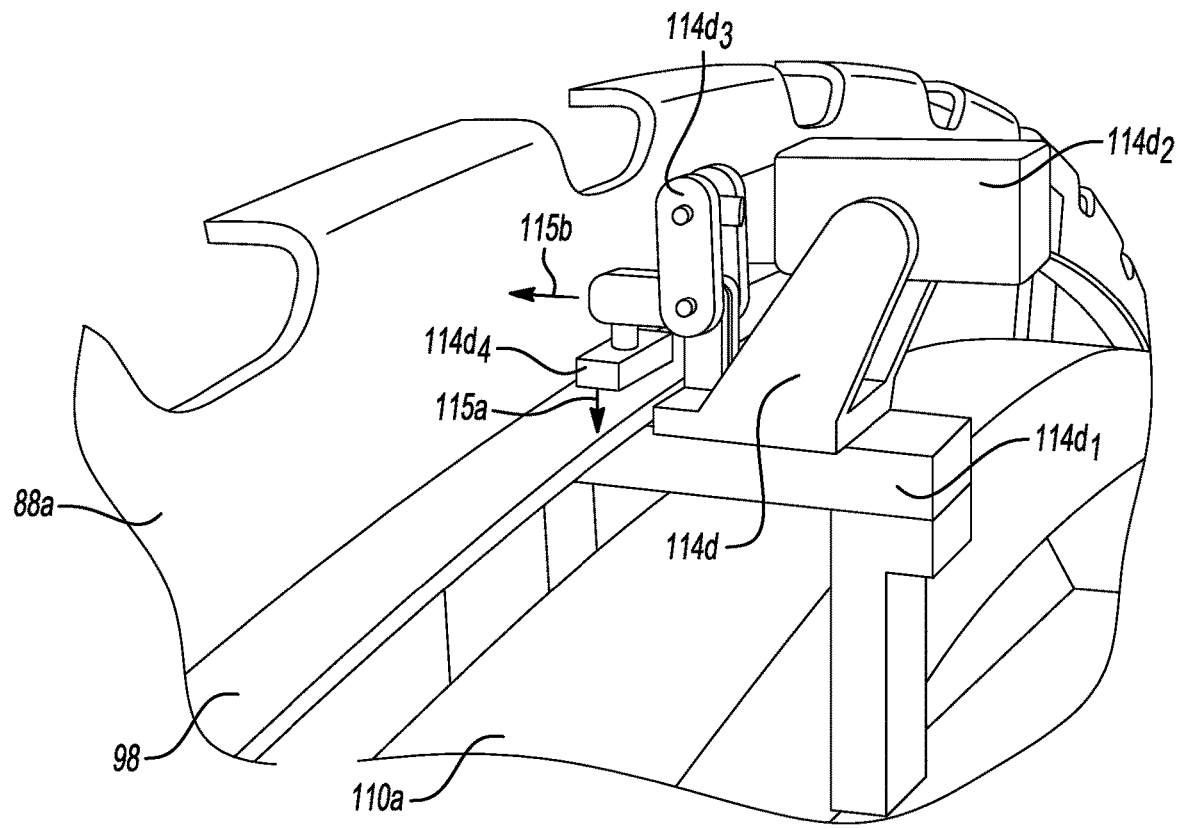
FIG. 15 is a schematic diagram of a retainer clamp in accordance with one or more exemplary embodiments.

Referring to FIG. 15, a schematic diagram of an example implementation of a retainer clamp 114d is shown in accordance with one or more exemplary embodiments. Each retainer clamp 114d includes a retainer base 114d1, a retainer actuator 114d2, a retainer arm 114d3, and a retainer pad 114d4.

The retainer base 114d1 is directly connected to the frame carriage 110a and provides overall support for the retainer clamp 114d. The retainer actuator 114d2 is coupled to the retainer base 114*d*1 and is configured to provide linear motion toward and away from the aircraft fuselage frame 88*a*, as commanded by the controller 120. The retainer arm 114*d*3 is generally an "L" shaped arm that is pivotably connected to the retainer base 114*d*1, and to the retainer actuator 114*d*2. The retainer pad 114*d*4 is connected to the retainer arm 114*d*3 opposite the retainer actuator 114*d*2.

While the retainer actuator 114*d*2 presses toward the aircraft fuselage frame 88*a*, the retainer arm 114*d*3 pivots to press the retainer pad 114*d*4 downward into the ledge 98 of the aircraft fuselage frame 88*a*. The retainer pad 114*d*4 thus applies a first force 115*a* against the ledge 98 to restrain the aircraft fuselage frame 88*a* against the frame carriage 110*a*. Optionally, the retainer arm 114*d*3 may present a second force 115*b* horizontally against the aircraft fuselage frame 88*a* to assist the fixation clamps 114*a* in pressing the aircraft fuselage frame 88*a* against the frame hard stops 116*a*.

Figure 16:
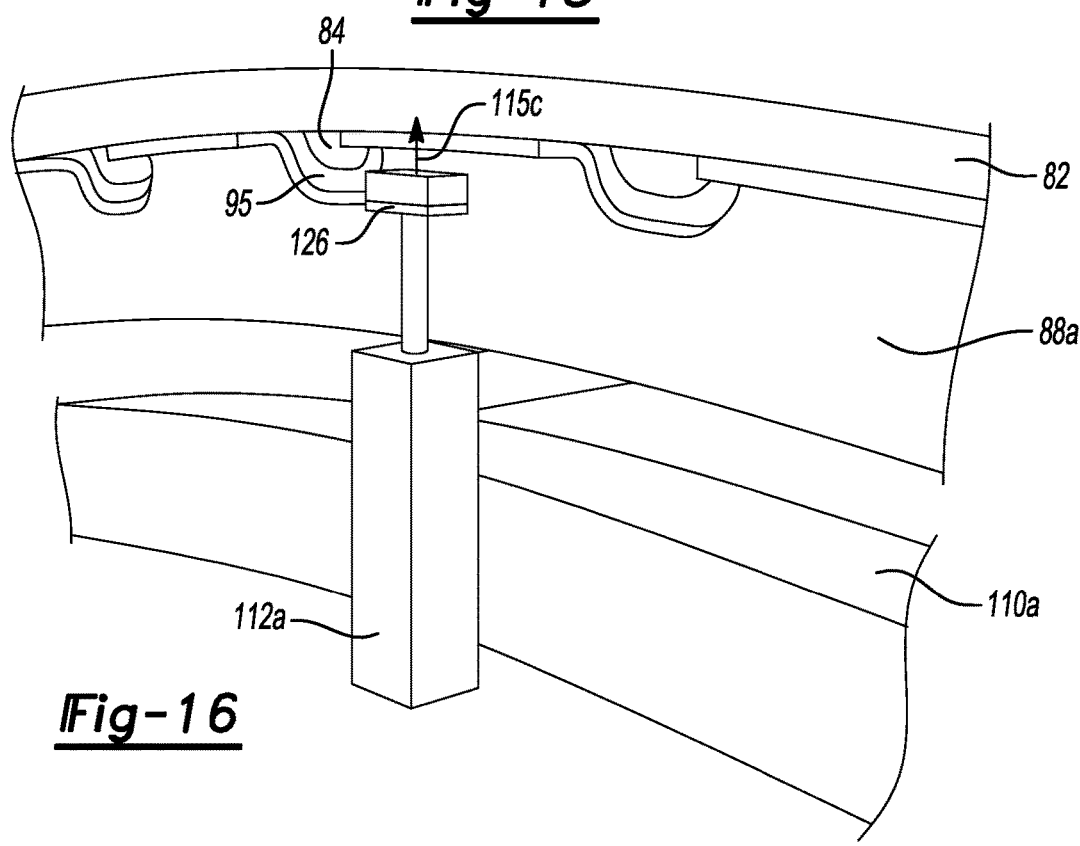
FIG. 16 is a schematic diagram of a foot actuator and a foot pad in accordance with one or more exemplary embodiments.

Referring to FIG. 16, a schematic diagram of an example implementation of a foot actuator 112*a* and a foot pad 126 is shown in accordance with one or more exemplary embodiments. The foot actuators 112*a* and the foot pads 126 are disposed along the curvature of the frame carriage 110*a*. The foot pads 126 are positioned to contact the feet 94 of the aircraft fuselage frame 88*a*. After the aircraft fuselage frame 88*a* has been brought into contact with the panel 82 and the mouse holes 95 are situated over the stringers 84, the foot actuators 112*a* may be extended to press the foot pads 126 against the feet 94 of the aircraft fuselage frame 88*a*. Each foot pad 126 may apply a third force 115*c* that presses the feet 94 against the panel 82. In various embodiments, the foot actuators 112*a* may be extended simultaneously in situations where the aircraft fuselage frame 88*a* is relaxed in a single motion by placing the clamp actuators 112 in the floating mode. In other embodiments, the foot actuators 112*a* may be extended in a sequence where the aircraft fuselage frame 88*a* is relaxed gradually through a controlled extension of the clamp actuators 112. After the aircraft fuselage frame 88*a* has been partially tacked to the panel 82, or fully attached to the panel 82, the foot actuators 112*a* are retracted to pull the foot pads 126 away the aircraft fuselage frame 88*a*.

Figure 17:
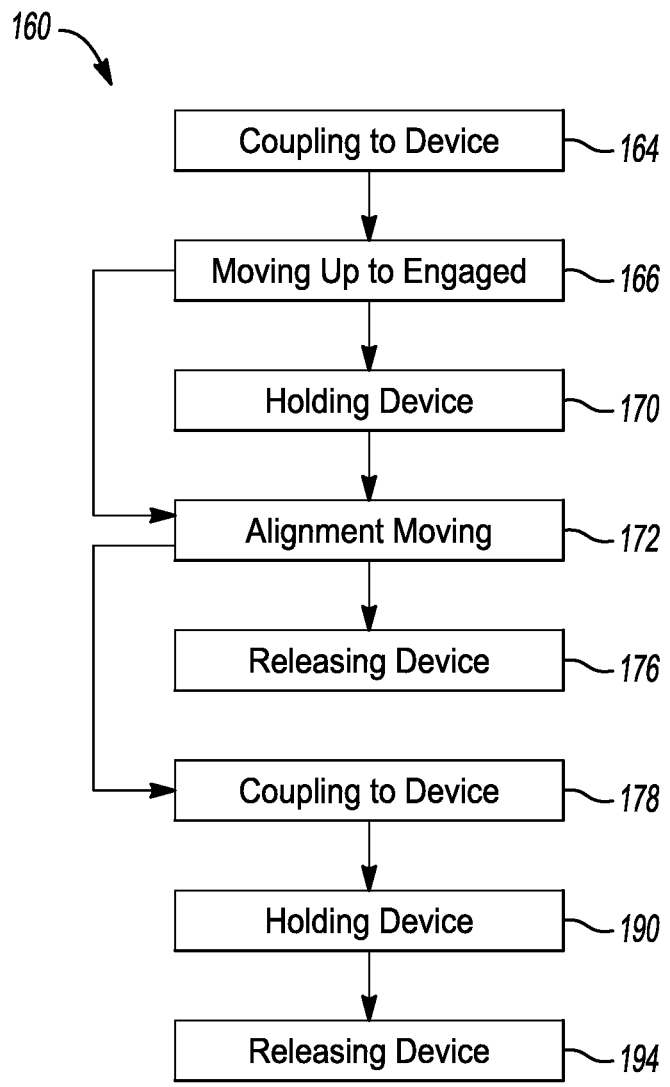
FIG. 17 is a flow diagram for operation of the positioning tool in accordance with one or more exemplary embodiments.

Referring to FIG. 17, a flow diagram of an example method 160 of operating the positioning tool 100 is shown in accordance with one or more exemplary embodiments. The method 160 generally comprises a step 164, a step 166, a step 170, a step 172, a step 176, a step 178, a step 190, and a step 194. The sequence of steps is shown as a representative example. Other step orders may be implemented to meet the criteria of a particular application.

For installing with the frame positioning tool 100*a*, the frame positioning tool 100*d*, or the surround positioning tool 100*c*, a part 88 (e.g., an aircraft fuselage frame 88*a*, a door surround 88*c*1 or a window surround 88*c*2) is coupled to the carriage 110 in the step 164 while the stages 104 and the curved rails 106 (where implemented) are in the retracted position 152. The coupling may be achieved by closing the clamps 114. In the step 166, the carriage 110 and the part 88 are moved along the first axis 130 between the retracted position 152 and the engaged position 154 with the lift mechanism 102. The part 88 is held in the carriage 110 in the step 170 while in transit from the retracted position 152 to the engaged position 154. The part 88 and the carriage 110 are proximate (or near) to the panel 82 while the stages 104 and the curved rails 106 are in the engaged position 154. In the step 172, the carriage 110 is moved in the available degrees of freedom 140 to adjust a fine alignment of the carriage 110 to the panel 82 and brought into an initial contact with the panel 82. After the part 88 is attached to the panel 82 by the workers 70, the part 88 may be released from the clamps 114 on the carriage 110 in the step 176 while in the engaged position 154 and the carriage 110 and the part 88 are aligned with the panel 82.

For removing a part 88 (e.g., a door cutout 88*b*1 or a window cutout 88*b*2) with the cutout positioning tool 100*b*, the cutout carriage 110*b* is lifted in the step 172 to the engaged position 154. In the step 172, the cutout carriage 110*b* is manipulated in the six degrees of freedom 140 to finely align with a region of the panel 82 to be removed. The cutout hard stops 116*b* may engage the cutout 88*b* area while the suction cups 114*b* couple to the cutout 88*b* in the step 178. Thereafter, the cutout 88*b* is detached from the panel 82 by the milling head 78 (see FIG. 1). The carriage 110 holds the cutout 88*b* in the step 190 while in transit from the engaged position 154 to the retracted position 152. In the step 194, the cutout 88*b* is released by the suction cups 114*b* while in the retracted position 152 and the cutout carriage 110*b* is facing the bin system 118.

Figure 18:
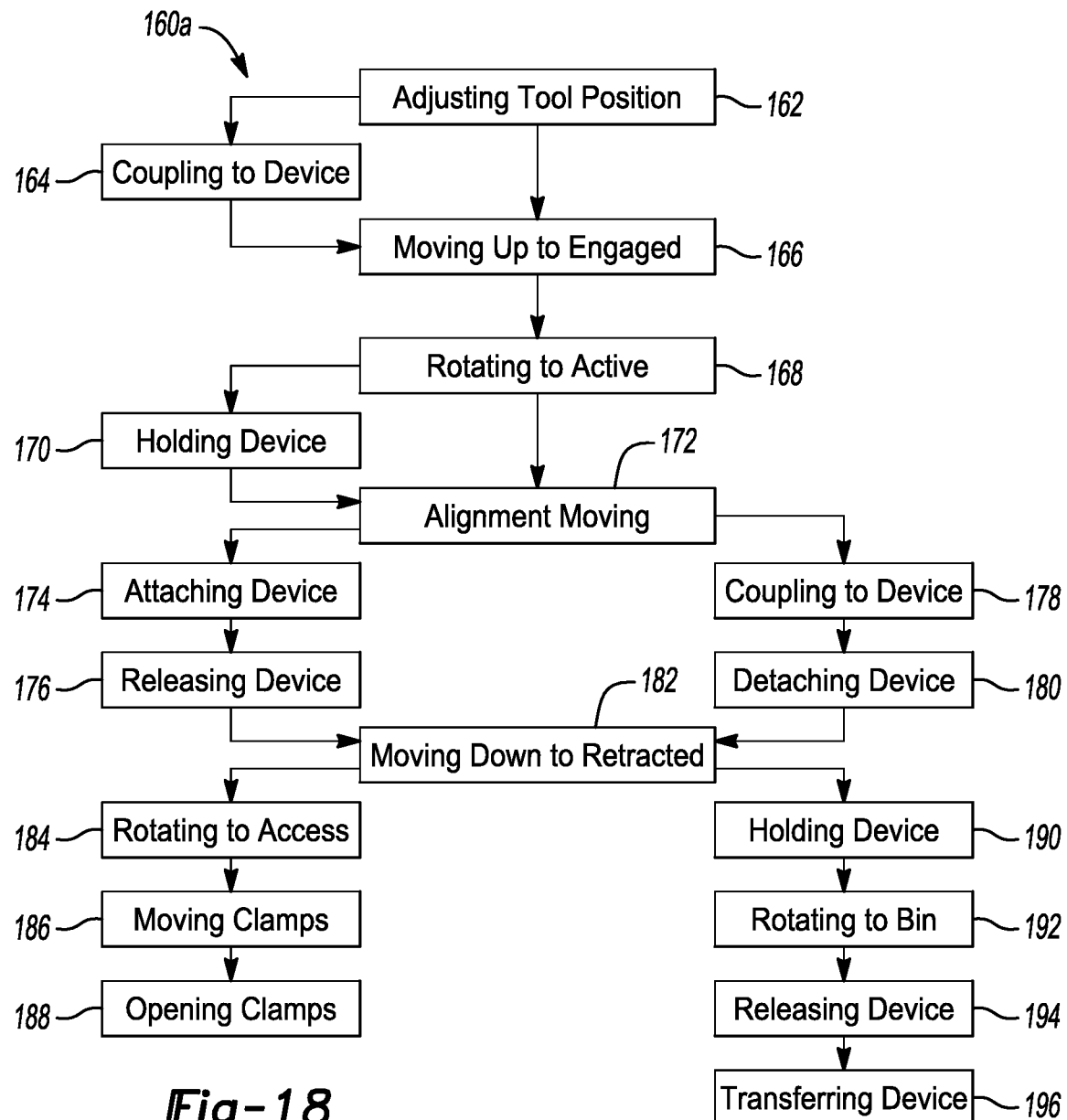
FIG. 18 is a flow diagram for installing and removing parts from an apparatus using the positioning tool in accordance with one or more exemplary embodiments.

Referring to FIG. 18, a flow diagram of an example method 160*a* of installing and removing parts 88 from an apparatus 80 using the positioning tool 100 is shown in accordance with one or more exemplary embodiments. The method (or process) 160*a* may be implemented by the positioning tool 100 under control of the workers 70 to assemble an apparatus 80 (e.g., an example of an aircraft 80*a* is illustrated). The method 160*a* generally comprises a step 162, a step 164, a step 166, a step 168, a step 170, a step 172, a step 174, a step 176, a step 178, a step 180, a step 182, a step 184, a step 186, a step 188, a step 190, a step 192, a step 194, and a step 196. The sequence of steps is shown as a representative example. Other step orders may be implemented to meet the criteria of a particular application.

In the step 162, a relative position between the aircraft 80*a* and the lift mechanism 102 is adjusted to locate the lift mechanism 102 below the aircraft 80*a* and in an initial alignment with a panel 82 being targeted inside the aircraft 80*a*. In various embodiments, the aircraft 80*a* may be moved into alignment with the lift mechanism 102. In other embodiments, the lift mechanism 102 may be moved into alignment with the aircraft 80*a*. In still other embodiments, both the aircraft 80*a* and the lift mechanism 102 may be moved.

For installations, a part 88 (e.g., an aircraft fuselage frame 88*a*, a door surround 88*c*1, or a window surround 88*c*2) is coupled to the carriage 110 in the step 164 while the stages 104 and the curved rails 106 (where implemented) are in the retracted position 152. The coupling may be achieved by closing the clamps 114. In the step 166, the stages 104, the curved rails 106, the carriage 110 and the part 88 are moved linearly along the first axis 130 between the retracted position 152 and the engaged position 154 with the lift mechanism 102. The carriage 110 may be rotated around the second axis 132 to an active position in the step 168 where the part 88 and the carriage 110 face the panel 82. The part 88 is held in the carriage 110 in the step 170 while the stages 104 and the curved rails 106 are in transit from the retracted position 152 to the engaged position 154 and rotated into alignment. In the step 172, the carriage 110 is moved in the available degrees of freedom 140 relative to the curved rails 106 to adjust a refined alignment of the carriage 110 to the panel 82 and brought into an initial contact with the panel 82. The part 88 and the carriage 110 are proximate (or near) to the panel 82 while the stages 104 and the curved rails 106 are in the engaged position 154.

The part 88 is attached to the panel 82 by the workers 70 in the step 174. In some embodiments, the attachment may be an initial tacking of the part 88 in place on the panel 82 followed by a permanent attachment of the part 88 to the panel 82. In the step 176, the part 88 may be released from the clamps 114 on the carriage 110 while in the engaged position 154 and the carriage 110 and the part 88 are aligned with the panel 82. The stages 104 and the carriage 110 are moved in the step 182 to the retracted position 152. In the step 186, the clamp actuators 112 and the foot actuators 112a (where implemented) are retracted. The clamps 114 are opened in the step 188 in preparation to receive another part 88.

For removal of a part 88 (e.g., a cutout 88b), after the aircraft 80a and the lift mechanism 102 have been aligned, the stages 104, the curved rails 106, and the carriage 110 are moved linearly along the first axis 130 between the retracted position 152 and the engaged position 154 in the step 166. In the step 168, the carriage 110 is rotated around the second axis 132 to the active position where the empty carriage 110 faces the panel 82. In the step 172, the carriage 110 is manipulated in the six degrees of freedom 140 to finely align with a region of the panel 82 to be removed. The cutout hard stops 116b may engage the cutout 88b area while the suction cups 114b couples to the cutout 88b in the step 178. The cutout 88b is detached from the panel 82 in the step 180 by the milling head 78 (see FIG. 1).

In the step 182, the carriage 110 and the cutout 88b are moved down to the retracted position 152. The carriage 110 holds the cutout 88b in the step 190 while in transit from the engaged position 154 to the retracted position 152. The carriage 110 is rotated in the step 192 to face the bin system 118 (e.g., at the side recycling position 138a or the bottom recycling position 138b). In the step 194, the cutout 88b is released by the suction cups 114b and the carriage 110 while the stages 104 and the curved rails 106 are in the retracted position 152, and the carriage 110 is facing the bin system 118. The cutout 88b is transferred by gravity from the positioning tool 100 into the bin system 118 in the step 194. The carriage 110 may subsequently be rotated back to face upward in preparation to receive another cutout 88b.

Figure 19:
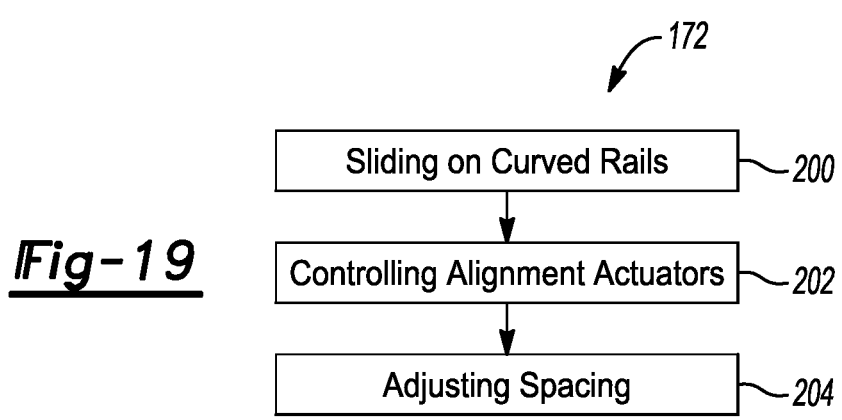
FIG. 19 is a flow diagram for motion in six degrees of freedom in accordance with one or more exemplary embodiments.

Referring to FIG. 19, a flow diagram of an example implementation of motion in the six degrees of freedom step 172 is shown in accordance with one or more exemplary embodiments. The step 172 includes a step 200, a step 202, and a step 204. The sequence of steps is shown as a representative example. Other step orders may be implemented to meet the criteria of a particular application.

In the step 200, the alignment actuators 108 slide along the curved rails 106 (e.g., a transverse rotation 140d) to provide an intended orientation around the horizontal axis 132. The carriage 110 and the part 88 are rotated about the other horizontal axis 134 (e.g., a longitudinal rotation 140e) by controlling the alignment actuators 108 in the step 202 to update the orientation. Where the part 88 is an aircraft fuselage frame 88a, adjusting the orientations about both horizontal axes 132 and 134 refines the alignment of the aircraft fuselage frame 88a to a stringer 84. Where the part 88 is a door surround 88c1 or a window surround 88c2, the orientations adjust a refined alignment of the door surround 88c1 or the window surround 88c2 with a corresponding door panel opening 86a or a window panel opening 86b in the panel 82. In the step 204, the spacing between the clamps 114 and the carriage 110 is adjusted using the clamp actuators 112 to bring the part 88 into contact with the panel 82.

Figure 20:
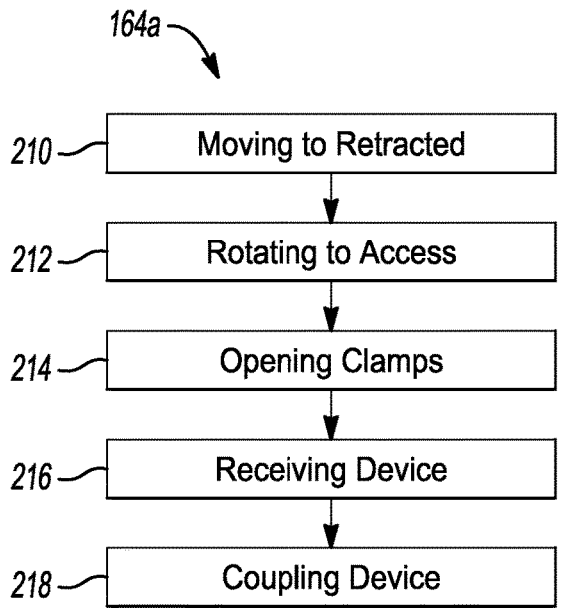
FIG. 20 is a flow diagram for coupling a door surround to a carriage in accordance with one or more exemplary embodiments.

Referring to FIG. 20, a flow diagram of an example implementation of a step 164a for coupling a door surround 88c1 or a window surround 88c2 to the surround carriage 110c is shown in accordance with one or more exemplary embodiments. The step 164a is a variation of the step 164. The step 164a includes a step 210, a step 212, a step 214, a step 216, and a step 218. The sequence of steps is shown as a representative example. Other step orders may be implemented to meet the criteria of a particular application.

In the step 210, the stages 104 are moved to the retracted position 152 in preparation to receive the door surround 88c1 or the window surround 88c2. The surround carriage 110c is rotated around the second (horizontal) axis 132 to face upward in the step 212. The jig clamps 114c are opened in the step 214. In the step 216, the door preassembly jig 90a with a door surround 88c1 already attached, or the window preassembly jig 90b with a window surround 88c2 already attached are received into the surround carriage 110c. The jig clamps 114c are closed in the step 218 to couple the door preassembly jig 90a and the door surround 88c1, or the window preassembly jig 90b and the window surround 88c2 to the surround carriage 110c.

Figure 21:
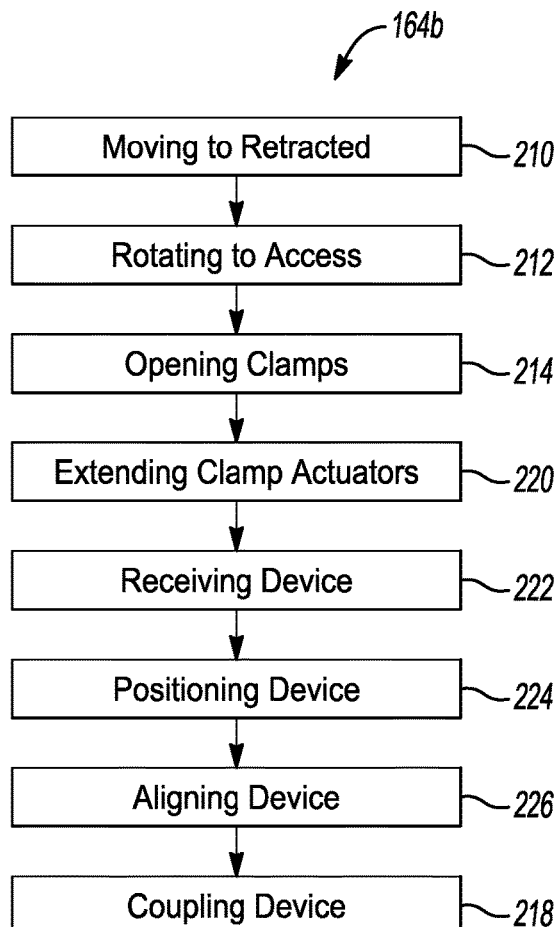
FIG. 21 is a flow diagram for coupling an aircraft fuselage frame to a carriage in accordance with one or more exemplary embodiments.

Referring to FIG. 21, a flow diagram of an example implementation of a step 164b for coupling an aircraft fuselage frame 88a to the frame carriage 110a is shown in accordance with one or more exemplary embodiments. The step 164b is a variation of the step 164. The step 164b includes the step 210, the step 212, the step 214, a step 220, a step 222, a step 224, a step 226, the step 218, a step 228, and a step 230. The sequence of steps is shown as a representative example. Other step orders may be implemented to meet the criteria of a particular application.

In the step 210, the stages 104 are moved to the retracted position 152 in preparation to receive the aircraft fuselage frame 88a. The frame carriage 110a is rotated around the second (horizontal) axis 132 to face upward in the step 212. The fixation clamps 114a and the retainer clamps 114d (where implemented) are opened in the step 214. In the step 220, the clamp actuators 112 are extended and the foot actuators 112a (where implemented) are retracted. The aircraft fuselage frame 88a is subsequently placed in the fixation clamps 114a and the retainer clamps 114d in the step 222. After placement, the aircraft fuselage frame 88a has the relaxed radius of curvature 96 that conforms to (e.g., matches a curvature of) the panel 82.

In the step 224, the aircraft fuselage frame 88a is positioned along the arc length 158 (see FIG. 7) of the frame carriage 110a before the fixation clamps 114a and the retainer clamps 114d are closed. The aircraft fuselage frame 88a is subsequently aligned to the alignment marks 124 (see FIG. 2) on the frame carriage 110a in the step 226. In the step 218, the aircraft fuselage frame 88a is coupled to the frame carriage 110a by closing the fixation clamps 114a and the retainer clamps 114d.

A stress is placed on the aircraft fuselage frame 88a by retracting the clamp actuators 112 in the step 228. The stress applied to the aircraft fuselage frame 88a is limited in the step 230 where the aircraft fuselage frame 88a engages with the frame carriage 110a. The retracted radius of curvature 156 is less than the relaxed radius of curvature 96 to allow for unobstructed passage of the aircraft fuselage frame 88a into the fuselage 81 and the mouse holes 95 around the stringers 84.

Figure 22:
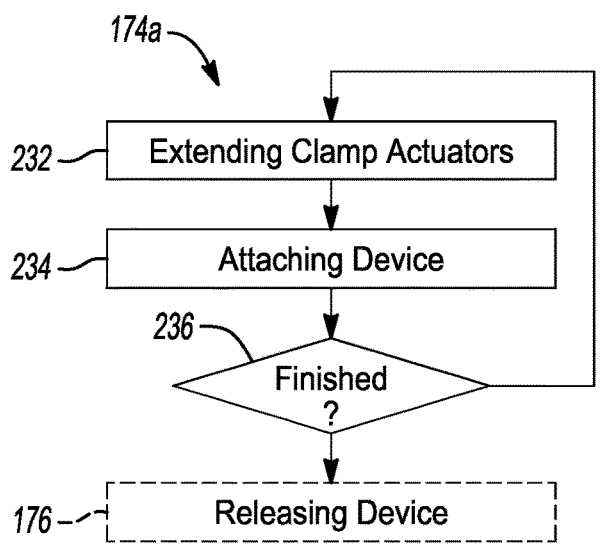
FIG. 22 is a flow diagram for coupling an aircraft fuselage frame to a panel in accordance with one or more exemplary embodiments.

Referring to FIG. 22, a schematic diagram of an example implementation of the step 174 for coupling an aircraft fuselage frame 88a to a panel 82 is shown in accordance with one or more exemplary embodiments. The step 174 may be implemented as a step 174a using the frame positioning tool 100a. The step 174a includes a step 232, a step 234, and a step 236. In the step 232, when the feet 94 around the point 93 of the aircraft fuselage frame 88a contact the inner mold line surface 83 of the panel 82, the stress on the aircraft fuselage frame 88a is released by extending the clamp actuators 112. The aircraft fuselage frame 88a subsequently returns to the relaxed radius of curvature 96 and mouse holes 95 of the aircraft fuselage frame 88a move around the stringers 84 of the panel 82. In the step 234, the aircraft fuselage frame 88a is attached to the stringer 84 of the panel 82. In some embodiments, the aircraft fuselage frame 88a may be initially tacked to the panel 82 and subsequently attached permanently to the panel 82. In situations where the stress on the aircraft fuselage frame 88a is released gradually, the step 174a may decide in the step 236 if additional stress should be released. If yes, the step 174a returns to the step 232 where the clamp actuators 112 are extended further. The loop around steps 232 to 236 may continue until all of the stress has been released from the aircraft fuselage frame 88a.

Referring to FIG. 23, a schematic diagram of another example implementation of the step 174 for coupling an aircraft fuselage frame 88a to a panel 82 is shown in accordance with one or more exemplary embodiments. The step 174 may be implemented as a step 174b using the frame positioning tool 100d. The step 174b includes a step 240, a step 242, a step 244, and a step 246. In the step 240, when the feet 94 around the point 93 of the aircraft fuselage frame 88a contact the inner mold line surface 83 of the panel 82, the stress on the aircraft fuselage frame 88a is released by placing the clamp actuators 112 into the floating mode. The floating mode generally allows the clamp actuators 112 to move due to the stress on the aircraft fuselage frame 88a. The aircraft fuselage frame 88a subsequently returns to the relaxed radius of curvature 96 and mouse holes 95 of the aircraft fuselage frame 88a move around the stringers 84 of the panel 82. In the step 242, the foot actuators 112a are extended thereby causing the foot pads 126 to press the feet 94 of the aircraft fuselage frame 88a against the panel 82. The pressing generally allows for drilling and fastening of the aircraft fuselage frame 88a to the panel 82. In the step 244, the aircraft fuselage frame 88a is attached to the panel 82. In some embodiments, the aircraft fuselage frame 88a may be initially tacked to the panel 82 and subsequently attached permanently to the panel 82. In situations where the stress on the aircraft fuselage frame 88a is released gradually, the step 174b may decide in the step 246 if additional stress should be release. If yes, the step 174b returns to the step 240 where the clamp actuators 112 are extended further. The loop around steps 240 to 246 may continue until all of the stress has been released from the aircraft fuselage frame 88a.

Referring to FIG. 24, a flow diagram on an example method 260 of aircraft production and service methodology is shown in accordance with one or more exemplary embodiments. The method (or process) 260 includes a step 262, a step 264, a step 266, a step 268, a step 270, a step 272, and a step 274. The sequence of steps is shown as a representative example. Other step orders may be implemented to meet the criteria of a particular application.

During pre-production, the method 260 may include specification and design in the step 262 of the aircraft 80a and material procurement in the step 264. During production, component and subassembly manufacturing is performed in the step 266 and system integration of the aircraft 80a takes place in the step 268. Thereafter, the aircraft 80a may go through certification and delivery in the step 270 in order to be placed in service in the step 272. While in service by a customer, the aircraft 80a is scheduled for routine work in maintenance and service per the step 274 (that may also include modification, reconfiguration, refurbishment, and so on). Apparatus and methods embodied herein may be employed during any one or more suitable stages of the production and service described in the method 260 (e.g., the specification and design step 262, the material procurement step 264, the component and subassembly manufacturing step 266, the system integration step 268, the certification and delivery step 270, the service step 272, and the maintenance and service step 274) and/or any suitable component of aircraft 80a (e.g., an airframe 300, systems 302, an interior 304, a propulsion system 306, an electrical system 308, a hydraulic system 310, and an environmental system 312). Each process of the method 260 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, a leasing company, a military entity, a service organization, and so on.

Referring to FIG. 25, a schematic diagram of example components of an aircraft 80a is shown in accordance with one or more exemplary embodiments. The aircraft 80a may be produced by the method 260. The aircraft 80a includes an airframe 300 with a plurality of systems 302 and an interior 304. Examples of the systems 302 include one or more of a propulsion system 306, an electrical system 308, a hydraulic system 310, and an environmental system 312. Any number of other systems may be included. Although an aerospace example is shown, the principles of the disclosure may be applied to other industries, such as the automotive industry. Embodiments of the positioning tool 100 enable an aircraft fuselage frame 88a to be installed into the fuselage of an aircraft 80a so that aircraft fuselage frame 88a does not impact the fuselage 81 before being completely installed. The aircraft fuselage frame 88a is manually set into and secured to the positioning tool 100. Before the aircraft fuselage frame 88a is lifted into place, the outer (lower) portion of the aircraft fuselage frame 88a is retracted inward (away from the fuselage 81) by moving the two opposing ends 92 inward with the positioning tool 100. Once in position, the positioning tool 100 lifts the aircraft fuselage frame 88a up into the fuselage 81. When the aircraft fuselage frame 88a reaches a target position, the positioning tool 100 releases the two opposing ends 92 of the aircraft fuselage frame 88a allowing the aircraft fuselage frame 88a to return to the relaxed radius of curvature 96. Once relaxed, the aircraft fuselage frame 88a completely contacts the inner mold line surface 83 for mounting. The clamp actuators 112 subsequently move the aircraft fuselage frame 88a to a final position for mounting to the fuselage 81.

Embodiments of the positioning tool 100 also provide a mechanism for automatedly removing sections cutout from the fuselage 81. The mechanism includes a lifting mechanism 102 that lifts the cutout carriage 110b from the retracted position 152, where the scrap material cut from the fuselage 81 is discarded, to the engaged position 154 to contact the fuselage 81 and support the panel 82 being cut. A vacuum created in the suction cups 114b holds the cutout 88b piece to the cutout carriage 110b. The clamp actuators 112 provide precise movement of the tooling to engage with the fuselage 81. The extended curved rails 106b provide an arched track that allows the cutout carriage 110b to move in an arched motion. The arched motion allows the cutout carriage 110b to engage with the fuselage 81 anywhere in the arched path and to rotate to different positions for discarding the cutout 88b (e.g., a door cutout 88b1 or a window cutout 88b2).

Embodiments of the positioning tool 100 further provide a mechanism for automatedly lifting and positioning a door surround 88c1 and a window surround 88c2 to a fuselage 81 of an aircraft 80a for installation. The mechanism includes the part lift mechanism 102b that lifts tooling from the retracted position 152, where the door surround 88c1 or the window surround 88c2 is loaded, to the engaged position 154 where the door surround 88c1 or the window surround 88c2 is aligned to the fuselage 81 for fastening. The alignment actuators 108 provide for precise movement of the door surround 88c1 and the window surround 88c2 to engage with the fuselage 81. The intermediate curved rails 106a provide an arched track that allows the surround carriage 110c to move in an arched motion to engage with the fuselage 81.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

We claim:

1. A positioning tool comprising:
    a lift mechanism having a plurality of stages configured to move linearly along a first axis between a retracted position and an engaged position;
    a plurality of curved rails mounted on the plurality of stages, wherein the plurality of curved rails form a plurality of arc-segments around a second axis;
    a carriage coupled to the plurality of curved rails and configured to be adjusted into a refined alignment with a panel, wherein the carriage is proximate to the panel while the plurality of stages are in the engaged position;
    a plurality of clamps coupled to the carriage and configured to releasably couple a part to the carriage while the plurality of stages are in the engaged position, hold the part in the carriage while the plurality of stages are between the engaged position and the retracted position, and releasably couple the part to the carriage while the plurality of stages are in the retracted position;
    a plurality of alignment actuators disposed between the plurality of curved rails and the carriage; and
    a controller configured to provide manual control of the plurality of alignment actuators to adjust the refined alignment of the carriage to the panel.

2. The positioning tool according to claim 1, wherein the plurality of alignment actuators is configured to slide along the plurality of curved rails and move the carriage in six degrees of freedom.

3. The positioning tool according to claim 1, further comprising a plurality of clamp actuators disposed between the carriage and the plurality of clamps, and configured to adjust a spacing between the plurality of clamps and the carriage.

4. The positioning tool according to claim 3, wherein the part is an aircraft fuselage frame, the carriage has a semi-circle shape with a radius, and the plurality of clamp actuators are further configured to adjust the spacing in a radial direction between the plurality of clamps and the carriage to press the aircraft fuselage frame against the panel.

5. The positioning tool according to claim 1, wherein the part is a cutout from the panel, the plurality of clamps are a plurality of suction cups, and the plurality of suction cups are configured to hold the cutout in place while the cutout is being separated from the panel.

6. The positioning tool according to claim 1, wherein the part is a door preassembly jig and a door surround, and the plurality of clamps are configured to releasably couple the door preassembly jig to the carriage.

7. The positioning tool according to claim 1, wherein the part is a window preassembly jig and a window surround, and the plurality of clamps are configured to releasably couple to window preassembly jig to the carriage.

8. The positioning tool according to claim 1, wherein the panel is a portion of an aircraft, the first axis is a vertical axis, the second axis is a horizontal axis, and the part is one of an aircraft fuselage frame, a door cutout from the panel, a window cutout from the panel, a door surround, or a window surround.

9. The positioning tool according to claim 1, wherein the panel is a portion of an apparatus, and the lift mechanism is disposed below the apparatus and in an initial alignment with the panel.

10. The positioning tool according to claim 1, wherein the second axis relocates with movement of the plurality of stages, and the second axis is perpendicular to the first axis.

11. The positioning tool according to claim 1, wherein the carriage is configured to move in six degrees of freedom relative to the plurality of curved rails to adjust the refined alignment.

12. A positioning tool comprising:
    a lift mechanism having a plurality of stages configured to move linearly along a first axis between a retracted position and an engaged position;
    a plurality of curved rails mounted on the plurality of stages, wherein the plurality of curved rails form a plurality of arc-segments around a second axis;
    a carriage coupled to the plurality of curved rails and configured to be adjusted into a refined alignment with a panel, wherein the carriage is proximate to the panel while the plurality of stages are in the engaged position;
    a plurality of clamps coupled to the carriage and configured to releasably couple a part to the carriage while the plurality of stages are in the engaged position, hold the part in the carriage while the plurality of stages are between the engaged position and the retracted position, and releasably couple the part to the carriage while the plurality of stages are in the retracted position; and
    a plurality of alignment actuators disposed between the plurality of curved rails and the carriage, and configured to slide along the plurality of curved rails and move the carriage in six degrees of freedom.

13. The positioning tool according to claim 12, further comprising a plurality of foot actuators configured to press the part to the panel while the plurality of stages is in the engaged position.

14. The positioning tool according to claim 13, wherein the carriage has a semicircle shape with a radius, and the plurality of foot actuators is further configured to move in a radial direction to press the part against the panel.

15. The positioning tool according to claim 14, further comprising a plurality of foot pads disposed on the plurality of foot actuators and configured to engage a plurality of feet of the part.

16. The positioning tool according to claim 12, further comprising:
   an XY float table disposed between the plurality of stages and the carriage; and
   a controller further configured to provide manual control of the XY float table to adjust an alignment of the part to the panel.

17. The positioning tool according to claim 12, wherein the plurality of clamps is further configured to bow the part while the plurality of stages is in the retracted position.

18. The positioning tool according to claim 17, wherein the plurality of clamps is further configured to hold the part to the carriage while the plurality of stages is between the engaged position and the retracted position.

19. The positioning tool according to claim 18, wherein the plurality of clamps is further configured to release the part from the carriage while the plurality of stages is at the engaged position.

20. The positioning tool according to claim 17, wherein the plurality of clamps has a floating mode that enables the part to relax from being bowed to a relaxed radius of curvature that conforms to the panel.

* * * * *